US009308439B2

(12) United States Patent
Aoki et al.

(10) Patent No.: US 9,308,439 B2
(45) Date of Patent: Apr. 12, 2016

(54) CONTROLLING THREE-DIMENSIONAL PRESENTATION OF WAGERING GAME CONTENT

(71) Applicant: WMS Gaming, Inc., Waukegan, IL (US)

(72) Inventors: Dion K. Aoki, Chicago, IL (US); Mark B. Gagner, West Chicago, IL (US); Sean P. Kelly, Chicago, IL (US); Scott A. Massing, Lincolnwood, IL (US); Jamie W. Vann, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 293 days.

(21) Appl. No.: 13/785,776

(22) Filed: Mar. 5, 2013

(65) Prior Publication Data

US 2013/0267317 A1 Oct. 10, 2013

Related U.S. Application Data

(60) Provisional application No. 61/622,332, filed on Apr. 10, 2012.

(51) Int. Cl.
*G07F 17/32* (2006.01)
*A63F 13/00* (2014.01)
*H04N 13/02* (2006.01)
*H04N 13/04* (2006.01)

(52) U.S. Cl.
CPC ............ *A63F 13/00* (2013.01); *G07F 17/3206* (2013.01); *G07F 17/3211* (2013.01); *G07F 17/3239* (2013.01); *H04N 13/02* (2013.01); *H04N 13/04* (2013.01)

(58) Field of Classification Search
CPC ........... G07F 17/3211; H04N 13/0459; H04N 13/0022; H04N 13/0409; H04N 13/0275; H04N 13/0225
See application file for complete search history.

(56) References Cited

U.S. PATENT DOCUMENTS

| | | | |
|---|---|---|---|
| 7,311,607 B2 | 12/2007 | Tedsen et al. | |
| 7,857,700 B2 | 12/2010 | Wilder et al. | |
| 8,073,657 B2 | 12/2011 | Moore, III et al. | |
| 8,210,922 B2 | 7/2012 | Williams et al. | |
| 8,249,835 B2 | 8/2012 | Moore, III et al. | |

(Continued)

FOREIGN PATENT DOCUMENTS

| | | | |
|---|---|---|---|
| WO | WO 2005009052 A1 * | 1/2005 | |
| WO | WO-2005034054 | 4/2005 | |

*Primary Examiner* — Jason Skaarup
(74) *Attorney, Agent, or Firm* — DeLizio Law, PLLC

(57) ABSTRACT

Some embodiments of the inventive subject matter are directed to presenting wagering game content in stereoscopic 3D according to an optimal autostereoscopic view for an autostereoscopic display based on a viewing perspective of a player when the player views the wagering game content. Some embodiments are also directed to determining that the player looks away from the wagering game content and maintaining, or freezing, presentation of wagering game content in 3D according to the optimal autostereoscopic view. Some embodiments are directed to updating the optimal autostereoscopic view based on changes to the viewing perspective while the player looks away from the wagering game content. Some embodiment are also directed to changing the presentation of the wagering game content to 2D, and restoring the one or more portions to 3D based on a degree of player attentiveness after the player looks at the wagering game content again.

26 Claims, 13 Drawing Sheets

(56) References Cited

U.S. PATENT DOCUMENTS

| | | |
|---|---|---|
| 8,922,545 B2 * | 12/2014 | Bennett et al. .................. 345/419 |
| 2002/0186348 A1 * | 12/2002 | Covannon et al. ............. 351/240 |
| 2004/0266536 A1 * | 12/2004 | Mattice et al. ................... 463/43 |
| 2007/0271113 A1 | 11/2007 | Nelson et al. |
| 2008/0113745 A1 | 5/2008 | Williams et al. |
| 2008/0113775 A1 | 5/2008 | Williams et al. |
| 2008/0125219 A1 | 5/2008 | Williams et al. |
| 2008/0303746 A1 | 12/2008 | Schlottmann et al. |
| 2009/0009593 A1 * | 1/2009 | Cameron et al. ................. 348/51 |
| 2009/0061983 A1 * | 3/2009 | Kaufman ......................... 463/20 |
| 2010/0093429 A1 | 4/2010 | Mattice et al. |
| 2010/0228526 A1 | 9/2010 | Moore, III et al. |
| 2011/0109629 A1 * | 5/2011 | Ericson et al. ................. 345/423 |
| 2011/0201404 A1 | 8/2011 | Wells |
| 2012/0040756 A1 | 2/2012 | Moore, III et al. |
| 2012/0063651 A1 | 3/2012 | Pennington et al. |
| 2012/0330740 A1 | 12/2012 | Pennington et al. |
| 2015/0116197 A1 * | 4/2015 | Hamelink ...................... 345/156 |

* cited by examiner

CONTROLLING THREE-DIMENSIONAL PRESENTATION OF WAGERING GAME CONTENT

RELATED APPLICATIONS

This application is a non-provisional of, and claims the priority benefit of, U.S. Provisional Application Ser. No. 61/622,332 filed Apr. 10, 2012.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

TECHNICAL FIELD

Embodiments of the inventive subject matter relate generally to wagering game systems and networks that, more particularly, control three-dimensional presentation of wagering game content.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

One way to add visual appeal to wagering games is to present wagering game content using stereoscopic three-dimensional graphics. Stereoscopic three-dimensional graphics appear to have depth, so that graphical objects appear to hover in space, in front of displays. One way to present graphics with a stereoscopic three-dimensional effect (3D) is to utilize an autostereoscopic display. An autostereoscopic display can present content in 3D ("3D content") to a user without requiring the user to wear special 3D glasses or headgear. Some autostereoscopic displays utilize head tracking equipment, such as a camera, to track a position of a user's eyes. However, when a user moves his or her eyes entirely away from the camera the head tracking system resets a view of the 3D content to a default position. When the user looks back at the 3D display, then the camera has to begin re-tracking eye position again and will re-shift the appearance of the 3D content to the user's eyes again. However, during the re-shifting, the appearance of the 3D content may be temporarily blurred, doubled, or grainy to the viewer until the system realigns the view of the 3D content to the angle of the user's gaze. In a casino, the chances of a user looking away from an autostereoscopic display can be significant, such as in response to exciting events that occur in a group game or community event display, a presentation on a peripheral display, a win by another user, etc. Further, a good deal of wagering game content that is presented is based on random events (e.g., based on random number generation) and, therefore, cannot be pre-rendered. Rather, a gaming system must instantly determine which gaming elements, bonus content, etc., to present based on the random events and instantly render the presentation of that content which had just been selected for presentation. However, presenting 3D content on an autostereoscopic display that is not pre-rendered can be challenging especially when a user's viewing position may change or be interrupted based on interesting environmental stimuli that may occur within a casino. Therefore, presentation of 3D wagering game content via autostereoscopic displays within a casino presents certain challenges.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into four sections. The first section provides an introduction to embodiments. The second section describes example operations performed by some embodiments while the third section describes example operating environments. The fourth section presents some general comments.

Introduction

This section provides an introduction to some embodiments.

Figure 1:
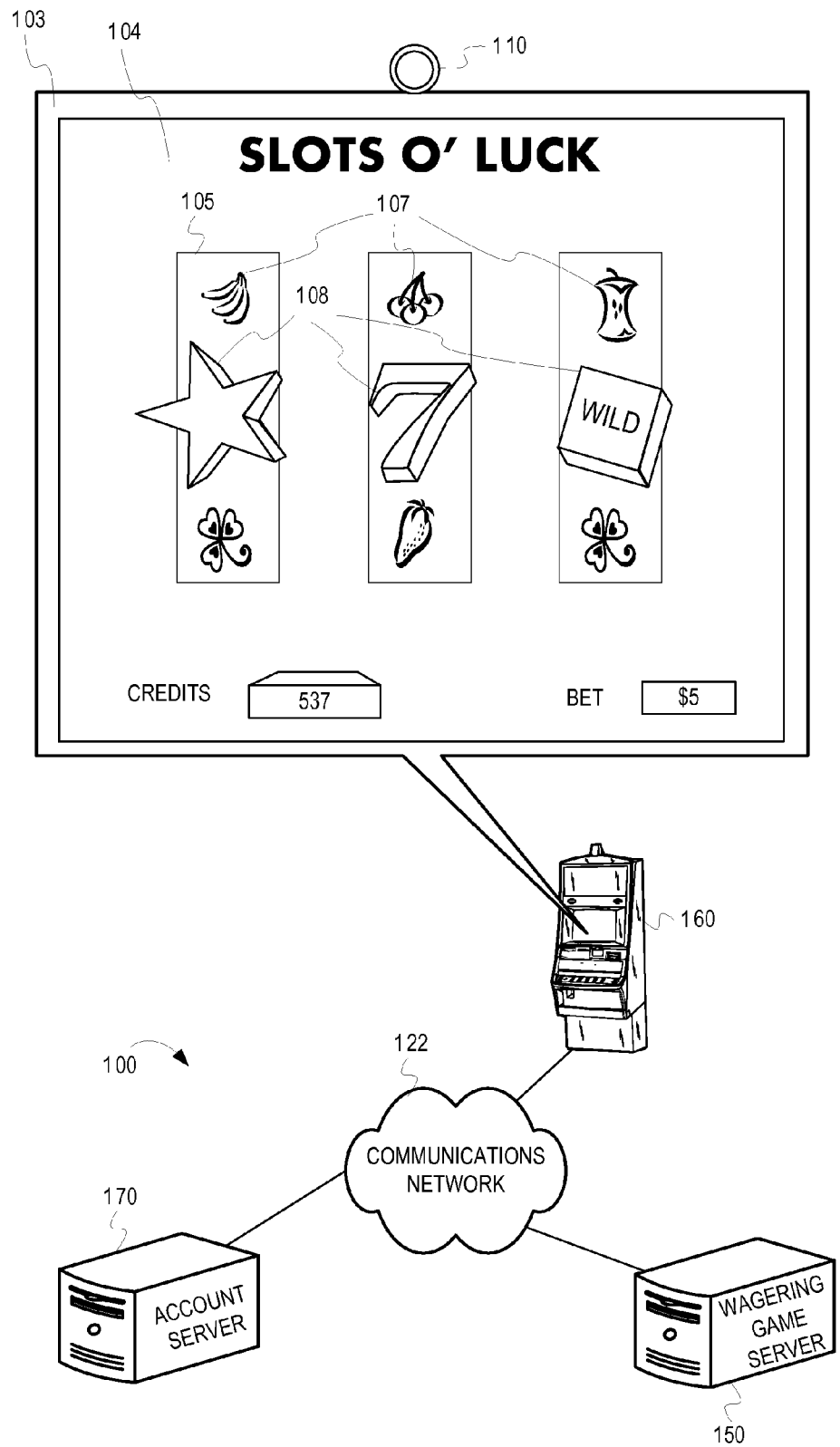
FIG. 1 is an illustration of autostereoscopic wagering game presentation, according to some embodiments.
Figure 2A:
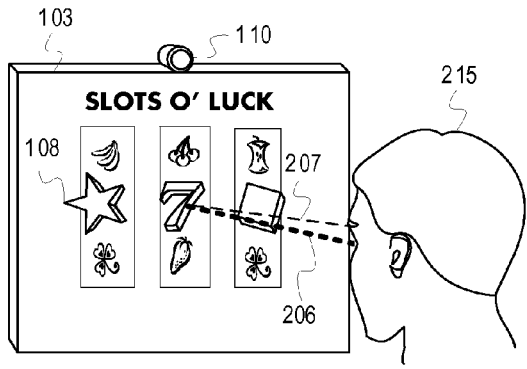
FIGS. 2A-2D are illustrations of presenting autostereoscopic wagering game content according to a last known viewing perspective of a player, according to some embodiments.

FIG. 1 is an illustration of autostereoscopic wagering game presentation, according to some embodiments. In FIG. 1, a wagering game system ("system") 100 according to some embodiments includes a wagering game machine 160 connected to a communications network 122. In some embodiments, the system 100 also includes a wagering game server 150 and an account server 170 that, in conjunction with the wagering game machine 160, provides account-based wagering game services to a wagering game player ("player"). The wagering game machine 160 includes a 3D display that can present wagering game content in with a binocular, or stereoscopic, 3D effect ("3D wagering game content"). In some embodiments, the 3D display is an autostereoscopic display 103, with one or more cameras, such as camera 110. The autostereoscopic display 103 is configured to present wagering game content 104 in stereoscopic 3D using various techniques that do not require the use of 3D glasses, viewers, or headgear. Stereoscopic 3D presented via an autostereoscopic display may be referred to herein as "autostereoscopic" 3D. In some embodiments, the wagering game content 104 includes wagering game playing elements, such as slot reels 105 and slot reel symbols. In some embodiments, some of the slot reel symbols are presented in 2D, such as symbols 107. In some embodiments, some of the slot reel symbols are presented in 3D, such as symbols 108, where two separate, nearly identical, images of the slot reel symbols 108 are presented to the left and right eyes of a player so that the player perceives the images as having binocular depth. Autostereoscopic displays can do this in various ways, many of which are known and do not need to be discussed in detail herein. In some embodiments, the system 100 uses the camera 110 to track movement of a player's eyes and a position of a player's head. FIGS. 2A-2D are illustrations of presenting autostereoscopic wagering game content according to a last known viewing perspective of a player, according to some embodiments. In FIG. 2A, the camera 110 senses when a player 215 changes the field of view of his gaze, or in other words, when the player's viewing perspective changes. The player's viewing perspective refers to the particular portion of a player's field of view that pertains to binocular vision or stereopsis. In FIG. 2A, the player's viewing perspective 206 is depicted as a single line to indicate the direction, or orientation, of the perspective. In some embodiments, the viewing perspective 206 represents a far edge of the player's binocular vision. The viewing perspective 206 can be determined by analyzing images of the player's eyes as recorded by the camera 110 to determine a location of the center of a player's eyes in relation to one or more features of the autostereoscopic display 103 (e.g., in relation to a surface, border, etc. of the autostereoscopic display 103). The system 100 adjusts and optimizes an autostereoscopic view 207 to the viewing perspective 206. For instance, the system 100 adjusts and optimizes the directions of presentation of the two binocular images of the 3D content such as by adjusting autostereoscopic presentation parameters of the 3D content. For instance, in some embodiments, the system 100 modifies a position or orientation of lenticular optics, parallax barriers, etc. within the autostereoscopic display 103, so that the appearance of the two binocular images appear clear and aligned with the player's viewing perspective 206. In some embodiments, the system 100 organizes data within a graphical buffer to appropriately present binocular images of the 3D content. By doing this, at least one of the views of the 3D content remains aligned with the viewer's gaze, preventing overlapped or offset views that look blurred, doubled, or grainy.

Figure 2B:
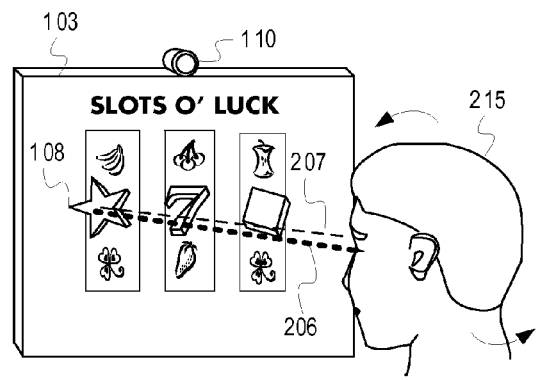

In FIG. 2B, the player 215 shifts his gaze to the left as the player 215 turns his or moves his head to the left. The camera 110 detects the player's eyes and/or head position move and/or rotate left and the system 100 detects that the player's viewing perspective 206 scans left across the face of the autostereoscopic display 103. In response, the system 100 modifies the presentation of the 3D content so that the autostereoscopic view 207 readjusts continuously to new presentation parameters that focus on the position of the player's eyes as the player's gaze continuously moves to the left. At some point, the system 100 detects that the player 215 is no longer looking at the 3D content, or in other words, the 3D content is no longer in the player's binocular vision. For example, FIG. 2B illustrates the last time, while the player's gaze moves left, that the system 100 determines that the position of the player's eyes, in relation to the autostereoscopic display, can perceive a stereoscopic 3D effect. The moment that the player 215 shifts his gaze away from the 3D content and is no longer looking at the 3D content, the system 100 freezes the autostereoscopic view 207 to remain the same as the last moment when the player 215 was still viewing the 3D content. The system 100 refrains from resetting the autostereoscopic view 207 to a default position for the 3D content. Instead, the system 100 maintains a presentation of the 3D content on the autostereoscopic display 103 according to the autostereoscopic view 207 depicted in FIG. 2B. While FIG. 2B illustrates an example of where the system 100 tracks as a player's gaze shifts horizontally in a left or right manner, the system 100 can also track as a player's gaze shifts vertically (i.e., track a degree of up and down movement of the eyes) or track off axis projection of the player's gaze (i.e., track a degree of lean-in or lean-out of the player 215 from the autostereoscopic display 103).

Figure 2C:
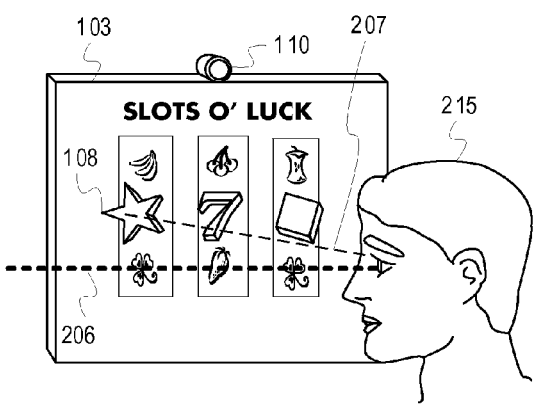
Figure 2D:
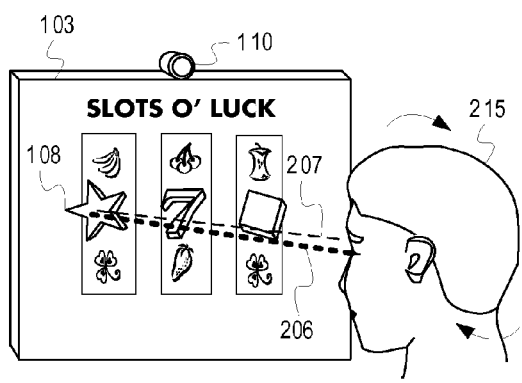

In FIG. 2C, the player 215 is looking away from the 3D content (i.e., the player's viewing perspective 206 is directed away from the 3D content), but begins to shift his gaze to the right to look back at the 3D content on the autostereoscopic display 103. In FIG. 2D, the player has shifted his gaze sufficiently to the right to again view the 3D content. Because, in FIG. 2B, the system 100 did not modify the autostereoscopic view 207, then, when the player 215 looked back at the 3D content in FIG. 2D, the appearance of the 3D content was not temporarily blurred, doubled, or grainy. In other words, the system 100 maintained the alignment of the autostereoscopic view 207 in anticipation that when the player 215 shifted his gaze back to the 3D content, the player 215 would likely follow a substantially reverse movement from that which the player 215 performed when the player was shifting his gaze away from the 3D content. For example, when the player 215 looks away from the autostereoscopic display 103 by turning his head to the left, he is likely to look back at the autostereoscopic display 103 by turning his head to the right in a substantially reverse manner. After the player 215 shifts his gaze back to the 3D content, as shown in FIG. 2D, the system 100, via the camera 110, continues tracking the position of the player's eyes and/or head and continues any necessary adjustments to the autostereoscopic view 207 based on the position and movement of the player's eyes and/or head.

Figure 3A:
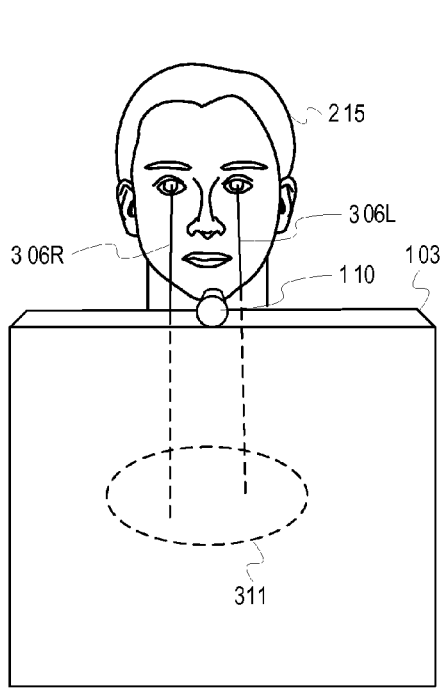
FIGS. 3A-3D are illustrations of tracking a last known viewing perspective of a player of wagering game content, according to some embodiments.
Figure 3C:
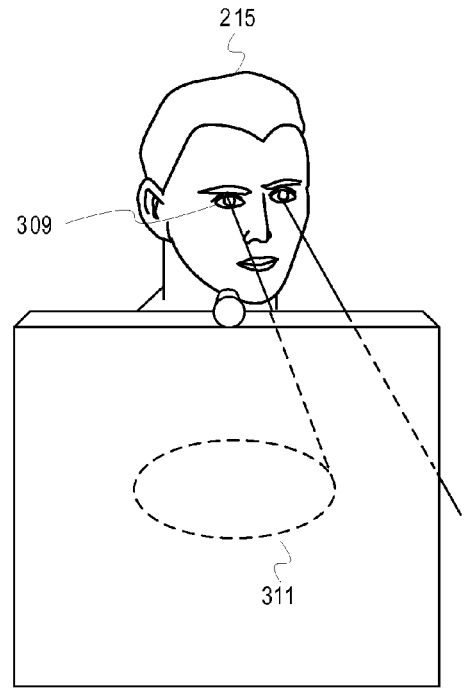
Figure 3B:
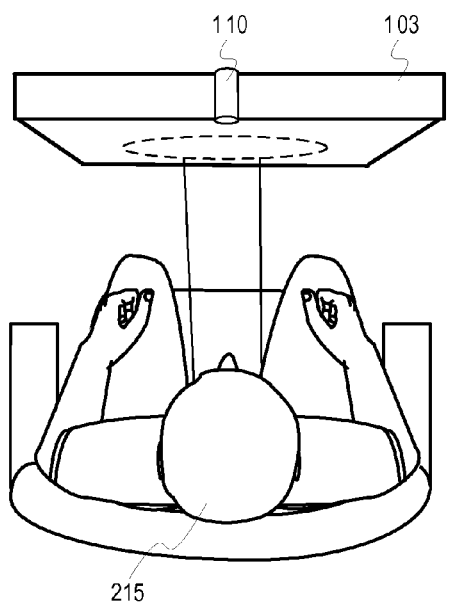
Figure 3D:
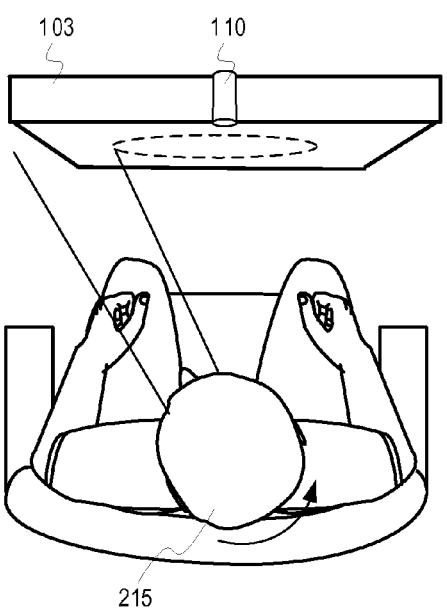

In some embodiments, as in FIGS. 3A-3D, the system 100 tracks multiple facial features, such as each of the player's eyes, both left and right eyes, to determine the last known position or orientation of either of the eyes before leaving a viewing area of 3D content. For example, in FIG. 3A, the camera 110 tracks a left viewing perspective 306L and a right viewing perspective 306R of both of the eyes of the player 215 as the player 215 views an area 311 of the autostereoscopic display 103. In some embodiments, the area 311 is within the portion of the field of view in which binocular 3D is perceptible (e.g., within 120 degrees (horizontally) of the human field of vision). FIG. 3B is an overhead view of FIG. 3A. In FIG. 3C, the system 100 tracks the movement of the player's head and eyes and tracks both the left viewing perspective 306L and right viewing perspective 306R. By tracking both eyes, the system 100 determines when the 3D content last is viewable from the player's combined binocular perspective.

In FIG. 3C, the system 100 determines that the player 215 turns his head to the left, and, hence, the right eye 309 of the player 215 is the most directly visible by the camera 110. Therefore, in some embodiments, the system 100 tracks when the right eye 309 stops viewing the 3D content on the autostereoscopic display 103 within the viewing area 311. In some embodiments, the system 100 determines when the player's gaze moves away from 3D content on the autostereoscopic display 103, but does not entirely leave the autostereoscopic display 103. For instance, as in FIG. 1 and FIGS. 2A-2D, the symbols 108 are the only portions of the gaming content that are in 3D. Therefore, the system 100 can track when the player's gaze shifts away from (e.g., when the player is no longer focused on or directly looking at) the 3D content, but may be looking at something else on the autostereoscopic display 103 that is not in 3D (e.g., a portion of the content that is rendered in 2D). In some embodiments, the system 100 tracks one or more eyes as well as one or more other features of the player 215, such as the player's eyebrows, ears, head, silhouette, etc. In some examples where the camera 110 cannot see the player's eyes, and instead where the system 100 can track only a head position and/or silhouette, the system 100 assumes that the player's eyes are looking directly forward.

Figure 4:
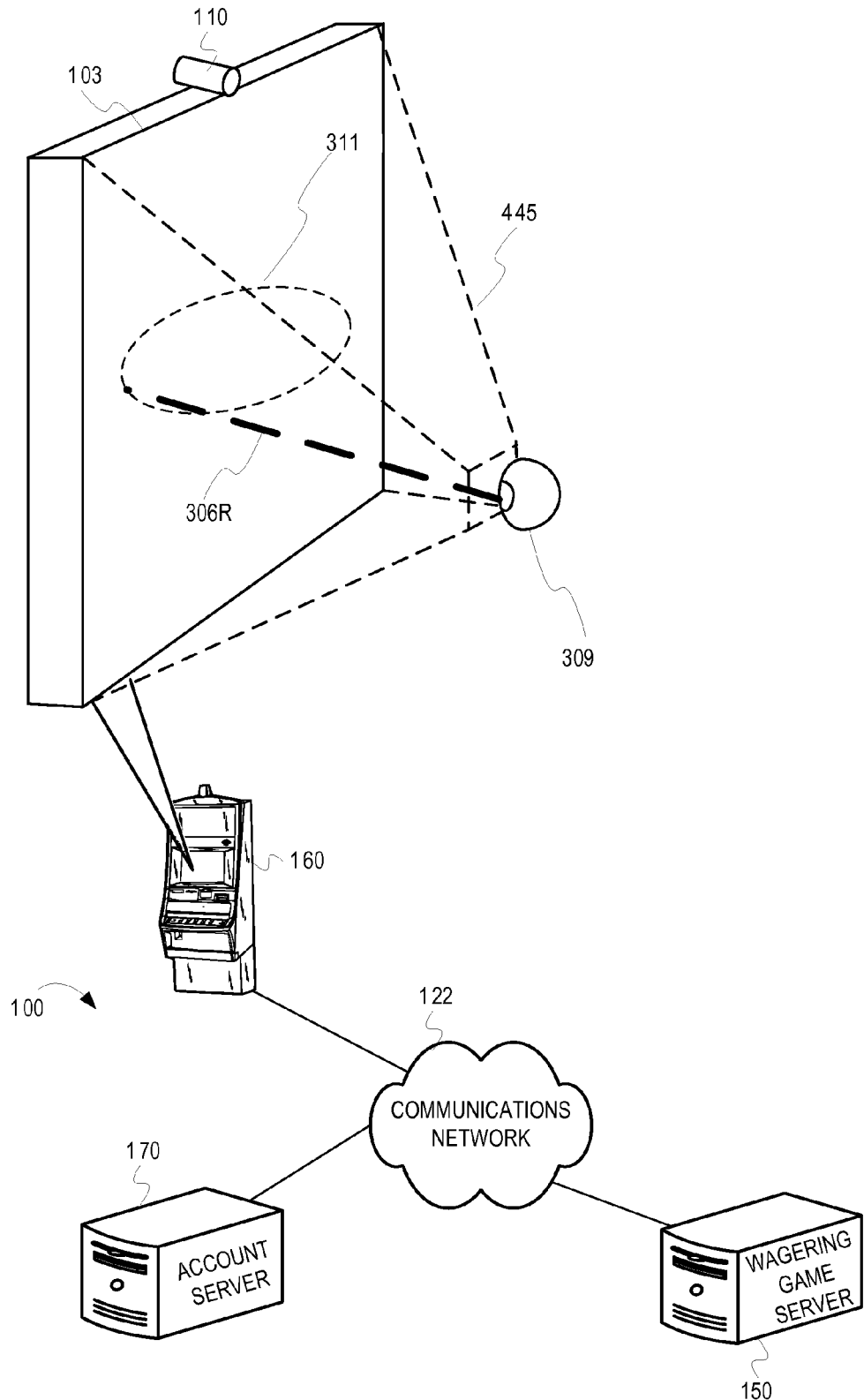
FIG. 4 is an illustration of storing a frustum of a last known viewing perspective of a player, according to some embodiments.

FIG. 4 is an illustration of storing a frustum of a last known viewing perspective of a player, according to some embodiments. For example, as similarly described in FIG. 1, FIG. 4 illustrates an example of the system 100, which includes the autostereoscopic display 103 and the camera 110. The system 100 computes a frustum 445 that is based on one or more points (e.g., the corners) of the autostereoscopic display 103 as references points in relation to at least the right eye 309 of the player 215. The frustum 445 represents the field of view in 3D space from the viewing perspective of the right eye 309. The frustum is a shape of a pyramid with the top cut off which cut-off portion ("apex") coincides with the center of the right eye 309. The corners of the base of the frustum 445 coincide with the corners of the autostereoscopic display 103 or, in other words, the frustum 445 is shaped relative to the four corners of the autostereoscopic display 103. The frustum 445 is only one example of a frustum and, in other embodiments, may be shaped differently with other dimensions, corner angles, etc. In other embodiments, the frustum 445 may coincide with other references points other than, or in addition to, the corners of the autostereoscopic display 103 (e.g., other points on the border of the autostereoscopic display 103, other points associated with the system 100, etc.). The system 100 can store data related to the frustum 445 within the wagering game machine 160, the wagering game server 450, or within the account server 470. The system 100 computes a view of a 3D image for the right eye 309 using at least one virtual camera that is aligned with the view 306R and whose virtual aperture is positioned to coincide with the apex of the frustum 445. As described above where the system 100 continuously updates the viewing perspective 207, in some embodiments, the system 100 continuously updates the frustum 445 and stores the data related to the frustum 445 until the last moment that the player's viewing perspective 306R is looking at the 3D content for the last time before looking away from the 3D content. Thus, the system 100 dynamically adjusts the frustum 445 to track the player's viewing position. The system 100 continuously tracks where the right eyeball 309 moves at the apex of the frustum 445. In response to the movement of the player's head, the entire frustum 445 needs to change according to the player's movement. Hence, the system 100 captures the last known shape of the frustum 445 from when the system 445 loses track of the player's eyeball movement and holds that shape of the frustum 445 in storage for rendering the content until the system 100 determines that the player's viewing perspective is looking at the 3D content again.

In some embodiments, the system 100 may lose track of the eyeballs of the player 215. The system 100 can track the player's head position, position of other viewable head elements, such as ears, nose, etc., as well as a general silhouette of the player 215. The system 100 detects movements of the user to predict what the frustum(s) will be when the player eventually moves his eyes back into the view of the camera 110. For example, the system 100 may lose track of the player's eye balls, but may detect, based on the position of the head, ears, silhouette, etc., that the player 215 looks to the left to see an event, but then, based on the player's head position moves to the right and downward (e.g., to look down into a purse or a backpack after looking at the event to the left or to look up at another event, such as an overhead event, a peripheral display, etc.). Thus, the system 100 can anticipate, based on the current position of the other visual clues associated with the player's head, face, body, etc., that the player's most likely re-engagement viewing position, upon moving his view back to the gaming content visible upon the autostereoscopic display 103, may be from another viewing position that is different form the viewing position where the player's view lost engagement with the content (e.g., the mostly likely re-engagement viewing position will be from the right side of the screen and slightly below). Thus, the system 100 can automatically adjust frusta accordingly for the left and right eyes based on the other visual clues of where the player's head, face, ears, body, etc. are at any given moment and/or based on the detected activity of the player. In some embodiments, the system 100 can also track other elements in the environment around the player 215, such as a position of the chair in which the player 215 sits, movements of the player 215 in the chair, etc. In some embodiments, for autostereoscopic displays 103 that may independently present multiple viewing perspectives that coincide with other viewers of the display (e.g., with other players that share the same 3D display), the system 100 can independently track the other player's movements, such as with other cameras, and apply techniques described herein independently for those other players.

Furthermore, in some embodiments, some wagering game content may be presented via a two-dimensional display in a way that appears to look like 3D or via types of 3D displays that are not autostereoscopic. For example, presentation of wagering game content via a two-dimensional display can present wagering game content with different angles of a scene in 2D based on a player's eye position (e.g., via head tracking), such as to generate a "look around" effect or to modify visual elements of a 2D object that give the impression of three-dimensional appearance (e.g., visual elements such as shadowing, texturing, skew, perspective, etc.). For instance, when a player moves position, a system, according to some embodiments, can modify visual elements of the 2D object, such as a lighting angle that casts simulated shadow effects on the 2D object, based on the player's head position. When a player looks away from the 2D display, the system can hold, or maintain, the lighting angle based on the last moment that the player was looking at the 2D display in anticipation that the player will look back at the 2D display (e.g., in a reverse manner to how the player looked away from the 2D display). The system can hold or maintain the lighting angle for the 2D content similarly described above for holding, or maintaining, an optimal autostereoscopic presentation when a player looks away from the autostereoscopic 3D display.

In some embodiments of the inventive subject matter examples of controlling presentation of wagering game content may refer to a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIGS. 1, 2A-2D, 3A-3D, and 4 describe some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 5:
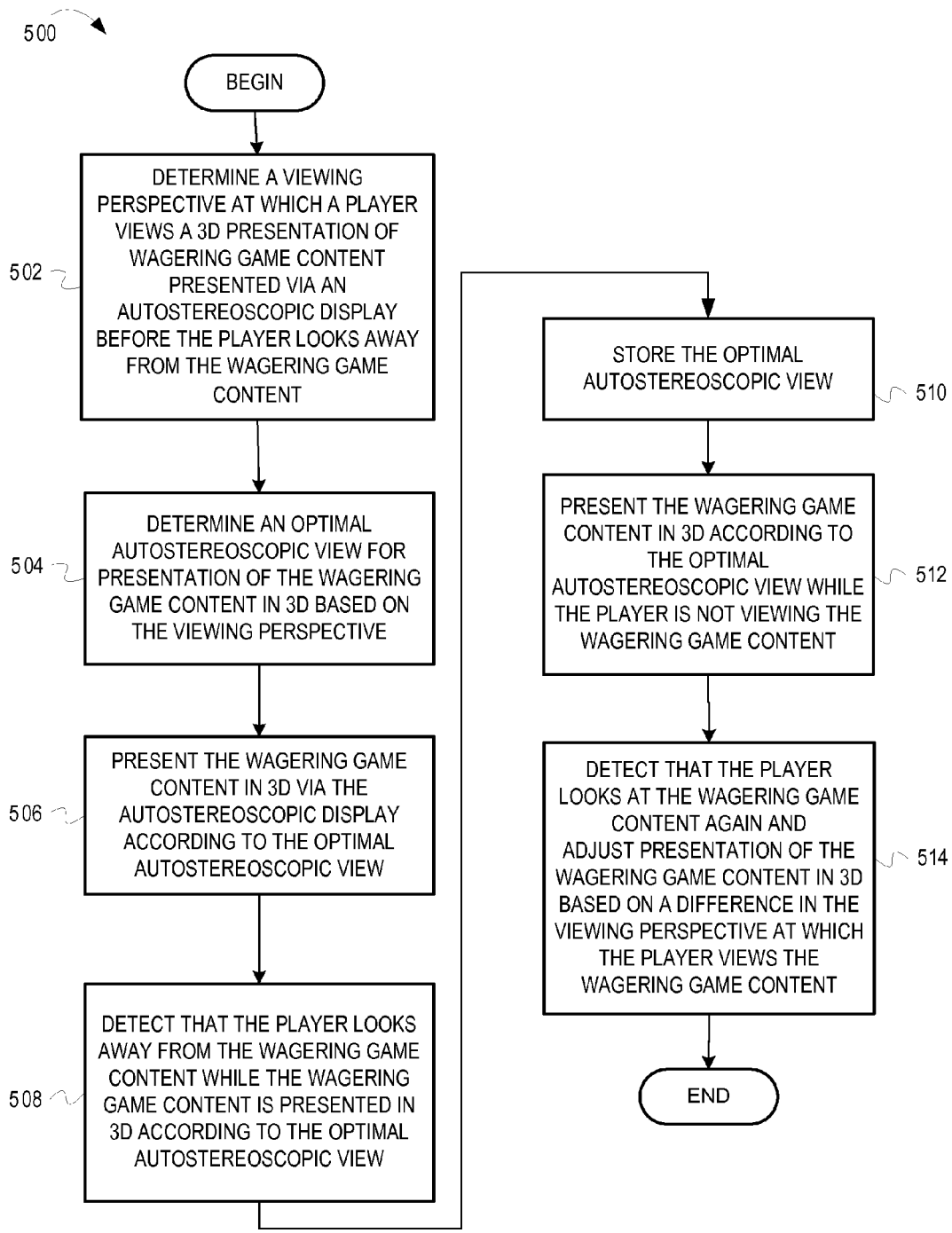
FIG. 5 is a flow diagram 500 illustrating presenting autostereoscopic wagering game content according to a last known viewing perspective of a player, according to some embodiments.

FIG. 5 is a flow diagram ("flow") 500 illustrating presenting autostereoscopic wagering game content according to a last known viewing perspective of a player, according to some embodiments. In FIG. 5, the flow 500 begins at processing block 502, where a wagering game system ("system") determines a viewing perspective at which a player views a 3D presentation of wagering game content presented via an autostereoscopic display before the player looks away from the wagering game content. The flow 500 continues at processing block 504, where the system determines an optimal autostereoscopic view for presentation of the wagering game content in 3D based on the viewing perspective. Furthermore, the flow 500 continues at processing block 506, where the system presents the wagering game content in 3D via the autostereoscopic display according to the optimal autostereoscopic view. FIG. 2A depicts an example of determining the viewing perspective 206 at which the player 215 views the 3D content (e.g., symbols 108) presented via the autostereoscopic display 103. The camera 110 records images of the location and/or orientation of the eyes of the player 215 in relation to the autostereoscopic display 103. The system 100 analyzes the images recorded by the camera 110 to detect an area of the autostereoscopic display 103 where the player 215 is looking (such as determining the area 311 shown in FIGS. 3A-3D). The system 100 can further record images of other features of the player, such as position and/or orientation of the player's ears, eyebrows, head, etc. The system 100 can track a silhouette of the player in relation to a background and/or in relation to other physical objects in the environment that surround the player.

Some examples of autostereoscopic 3D displays include lenticular lenses and parallax barriers that can focus certain views toward a viewer (e.g., by directing light/photons to a player's eyes using the lenses and/or by blocking views of pixels that may be seen from perspectives of any other observers). An autostereoscopic display can adjust the focus of the lenses and/or move the parallax barriers based on a detected position of the observer. The player may be positioned in one of a large number of potential positions in front of the autostereoscopic display. Therefore, the autostereoscopic display can present 3D content according to a large number of potential views. The system utilizes head tracking equipment, such as the camera 110 mentioned previously, to detect, from the large number of potential positions, a single position of the player's head, eyes and/or other specific features relative to the autostereoscopic display. Having narrowed the number of potential positions of the player to one single position, the system determines, based on the location of the player's pupils and/or irises within the player's eyes, where the player is looking, or in other words, determines a viewing perspective of the player, as described previously. Based on the player's viewing perspective, the system narrows the large number of potential views by which to present 3D content to a single view that corresponds to the player's viewing perspective. The single view is an optimal view for presentation of the wagering game content because it presents the 3D content with little or no blurring, overlapping, or other similar visual defects of stereoscopic images. In other words, in some example, operations associated with processing blocks 502 through 506 may more succinctly be described as operations that customize the presentation of the 3D content based on a location of the player relative to the 3D content and/or based on a position or directionality of the player's gaze. In some embodiments, as in FIGS. 2B-2C, the player's viewing perspective is off-set from a direct view of the gaming content. For example, in FIG. 2A the player 215 looks at the symbols from a viewing perspective 206 that is substantially aligned to a center of the autostereoscopic display 103. However, in FIG. 2B, the player 215 turns his head and/or shifts his head position such that his eyes move off-center and his gaze shifts leftward. The system 100 tracks the player's gaze as it moves further to the left, or in other words, the system 100 tracks the player's gaze as the gaze moves more offset from a centralized, default position at which the autostereoscopic display 103 is configured to present an optimal view of 3D content. In FIG. 2B, the system 100 tracks and responds to the player's gaze moving more to the left (i.e., more offset) by generating the optimal autostereoscopic view 207 according to the offset viewing perspective 206.

The flow 500 continues at processing block 508, where the system detects that the player looks away from the wagering game content while the wagering game content is presented in 3D according to the optimal autostereoscopic view. The description of FIG. 2C and FIGS. 3C, 3D, and 4 describe examples of detecting when a player's gaze has shifted and is no longer directly looking at 3D content on an autostereoscopic display.

The flow 500 continues at processing block 510, where the system stores the optimal autostereoscopic view. For example, in FIG. 4, the system 100 stores data related to the presentation of the 3D content within the area 311. As the player 215 moves his head and/or eyes to the right, the system 100 computes one or more frusta that correspond to the position and/or orientation of the eyes. The system 100 stores the computed values for the one or more frusta. In some embodiments, the system 100 further stores the position of elements of the autostereoscopic display 103, such as a position and/or orientation of lenses, parallax barriers, etc., that corresponds at least one of the one or more frusta, which is used to graphically present an optimal view of the 3D content.

The flow 500 continues at processing block 512, where the system presents the wagering game content in 3D according to the optimal autostereoscopic view while the player is not viewing the wagering game content. For instance, as in FIG. 2B, the system 100 presents the 3D content (e.g., the symbols 108) according to the autostereoscopic view 207 that was last presented before determining that the player 215 was no longer looking directly at the 3D content. For example, the system 100 freezes or locks autostereoscopic presentation parameters (e.g., freezes or locks a focus of lenses, a position of parallax barriers, a buffered image, etc.).

The flow 500 continues at processing block 514, where the system detects that the player looks at the wagering game content again and adjusts presentation of the wagering game content in 3D based on a difference in the viewing perspective at which the player views the wagering game content. For instance, after a player looks back at the 3D content, the system determines the exact positions and orientations of the player's eyes upon returning his gaze back to the 3D content. The system then adjusts the presentation of the content, such as to determine whether the position of the player's eyes is different from before and merits a change to the optimal autostereoscopic view. If so, the system adjusts the presentation of the 3D content to utilize a new optimal autostereoscopic view.

Figure 6:
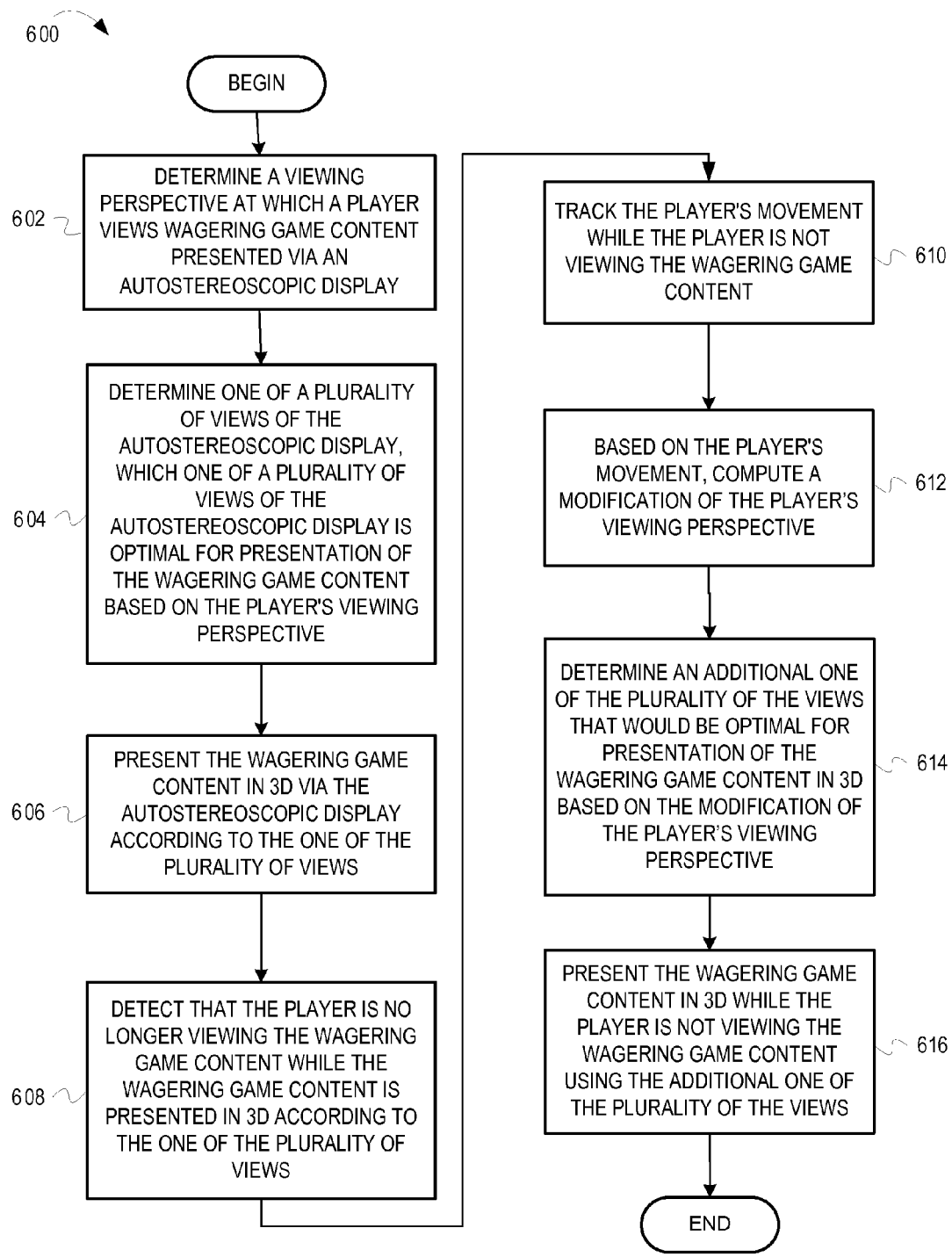
FIG. 6 is a flow diagram 600 illustrating presenting autostereoscopic wagering game content according to head tracking of a player while the player is looking away from the wagering game content, according to some embodiments.
Figure 7A:
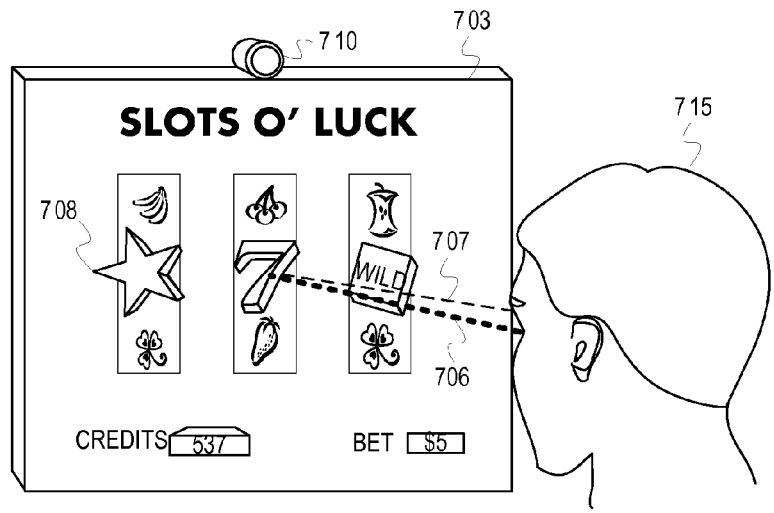
FIGS. 7A-7C is an illustration of presenting autostereoscopic wagering game content according to head tracking of a player while the player is looking away from the wagering game content, according to some embodiments.
Figure 7B:
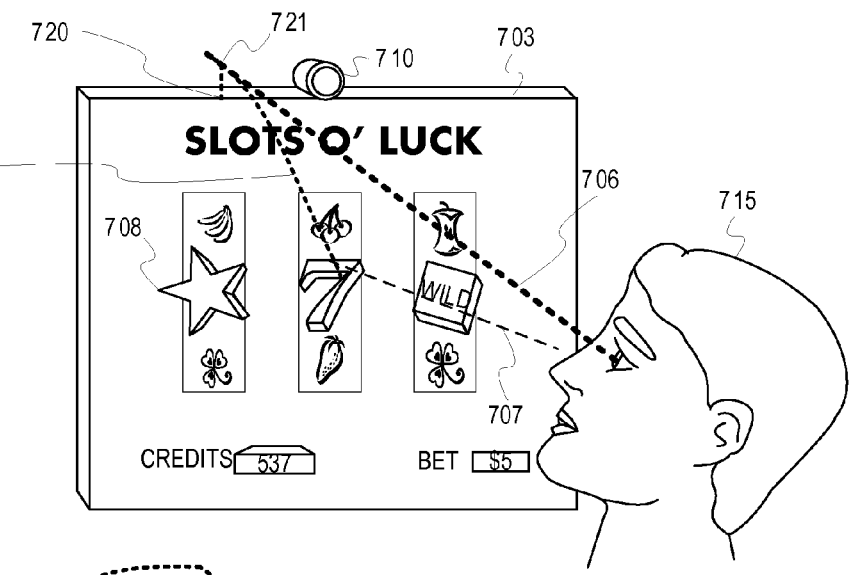
Figure 7C:
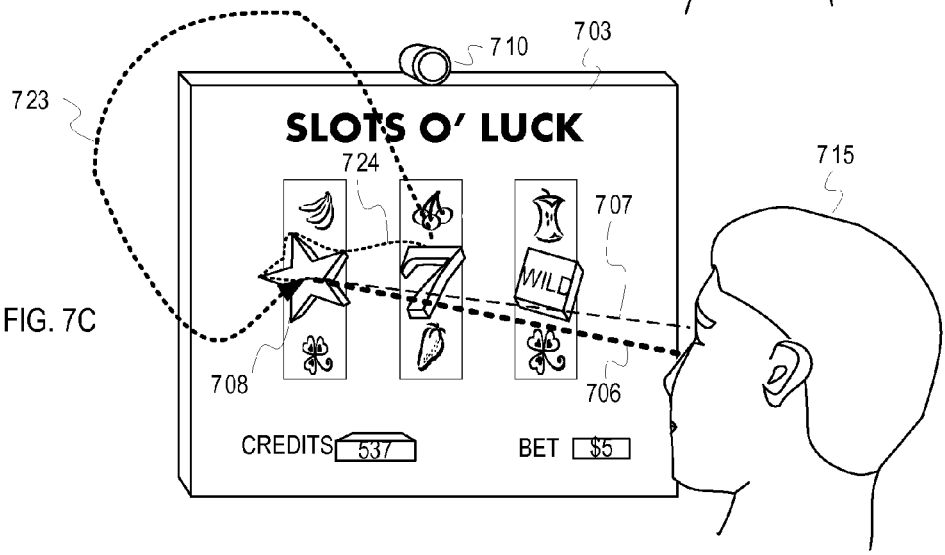

FIG. 6 is a flow diagram ("flow") 600 illustrating presenting autostereoscopic wagering game content according to head tracking of a player while the player is looking away from the wagering game content, according to some embodiments. FIGS. 7A-7C are conceptual diagrams that help illustrate the flow of FIG. 6, according to some embodiments. This description will present FIGS. 7A-7C in concert with FIG. 6. In FIGS. 7A-7C, the flow 600 begins at processing block 602, where a wagering game system ("system") determines a viewing perspective at which a player views wagering game content presented via an autostereoscopic display. The flow 600 continues at processing block 604, where the system determines one of a plurality of views of the autostereoscopic display, which one of a plurality of views of the autostereoscopic display is optimal for presentation of the wagering game content based on the player's viewing perspective. The flow 600 continues at processing block 606, where the system presents the wagering game content in 3D via the autostereoscopic display according to the one of the plurality of views. The flow 600 continues at processing block 608, where the system detects that the player is no longer viewing the wagering game content while the wagering game content is presented in 3D according to the one of the plurality of views. Operations associated with processing blocks 602, 604, 606 and 608 are similar to the description associated with processing blocks 502, 504, 506, and 508. In FIG. 7A, for example, the system, via a camera 710, records a location and/or orientation of eyes of a player 715 as the player 715 looks at 3D content (i.e., one or more symbols 708) presented via an autostereoscopic display 703. The system detects a viewing perspective 706 of the player 715 and presents the 3D content using an optimal autostereoscopic view 707.

The flow 600 continues at processing block 610, where the system tracks the player's movement while the player is not viewing the wagering game content. For example, in FIG. 7B, the player 715 looks upward and around the environment surrounding the autostereoscopic display 703, but does not look directly at the 3D content on the autostereoscopic display 703. While the player looks around, the camera 710 tracks the movement of the player 715, such as the movement and/or position of the player's eyes, if visible, and/or other features of the player. For instance, if the eyes of the player 715 are not visible to the camera 710, then the camera 710 tracks other features of the player 715 that would indicate a potential position or location of the player's eyes, such as the location of an ear, a nose, or another facial feature. In some embodiments, the system can also detect or estimate where the player is looking from one or more other sensing devices, such as other cameras in the environment, location sensors on headgear worn by the player 715, pressure sensors in a chair associated with a wagering game system which detect a direction that a player is leaning, and so forth.

The flow 600 continues at processing block 612, where the system, based on the player's movement, computes a modification to the viewing perspective of the player. The flow 600 continues at processing block 614, where the system determines an additional one of the plurality of the views that would be optimal for presentation of the wagering game content in 3D based on the modified viewing perspective. Further, the flow 600 continues at processing block 616, where the system presents the wagering game content in 3D while the player is not viewing the wagering game content using the additional one of the plurality of the views. For example, in FIG. 7B, the system detects a position of the player's eyes or estimates a position of the player's eyes based on a current head position of the player 715. The system computes a modification or change of the viewing perspective 706 (either an exact viewing perspective when the eyes are visible to the camera 710 or an estimated viewing perspective if the eyes are not visible) as the player 715 is looking away from the 3D content. Based on the modification to the viewing perspective 706, the system modifies the autostereoscopic view 707 to optimally present 3D content according to the current location or position of the player's eyes and/or head. For instance, in FIG. 7B, the player 715 has his head tilted backward, as if looking at an overhead display. If, with his head still tilted backward, the player 715 were to glance downward and to the right at the 3D content on the autostereoscopic display 703, the system would have already adapted the autostereoscopic view 707 to have an optimal view that is substantially based on the viewing perspective 706. In some embodiments, the system predicts what the viewing perspective 706 would be if the player were to, at the moment, look back at the 3D content at the autostereoscopic display 703 from his current head position. For instance, the system may detect that the player 715 is looking above the autostereoscopic display 703. The system determines that if the player 715 were to look back at the wagering game content, the player's gaze would first encounter a top portion of the symbols 708, and, therefore, the system presents an optimal autostereoscopic view 707 that would present the 3D content optimally as if the player 715 were looking at the top portion of the symbols 708. In some embodiments, the system determines a point 720 on the autostereoscopic display 703 that is aligned with the viewing perspective 706 (e.g., the point 720 on the border of the autostereoscopic display 703 that is orthogonal to a point 721 in line with the viewing perspective 706 and directly above the autostereoscopic display 703) and selects the portion of the wagering game content that is closest to the point 720 on the autostereoscopic display 703.

In FIG. 7C, the system continues to track the player's viewing perspective 706 as it travels a path 723 away from the wagering game content and/or away from the autostereoscopic display 703. In response, the system continuously updates the autostereoscopic view 707 to be optimal for the player's current head position at any point along the path 723 that corresponds to the player's viewing perspective 706. In other words, based on the path 723 of the player's viewing perspective 706, the system presents a series of potential optimal autostereoscopic views (as indicated on path 724) based on potential portions of the 3D wagering game content that would likely first be encountered by the player if the player were to look at the 3D content again. In some embodiments, the system determines the path 724 of potential points by selecting at least one portion of the 3D content that is closest to a point along a border of the autostereoscopic display 703 that is closest to the path 723.

Figure 8:
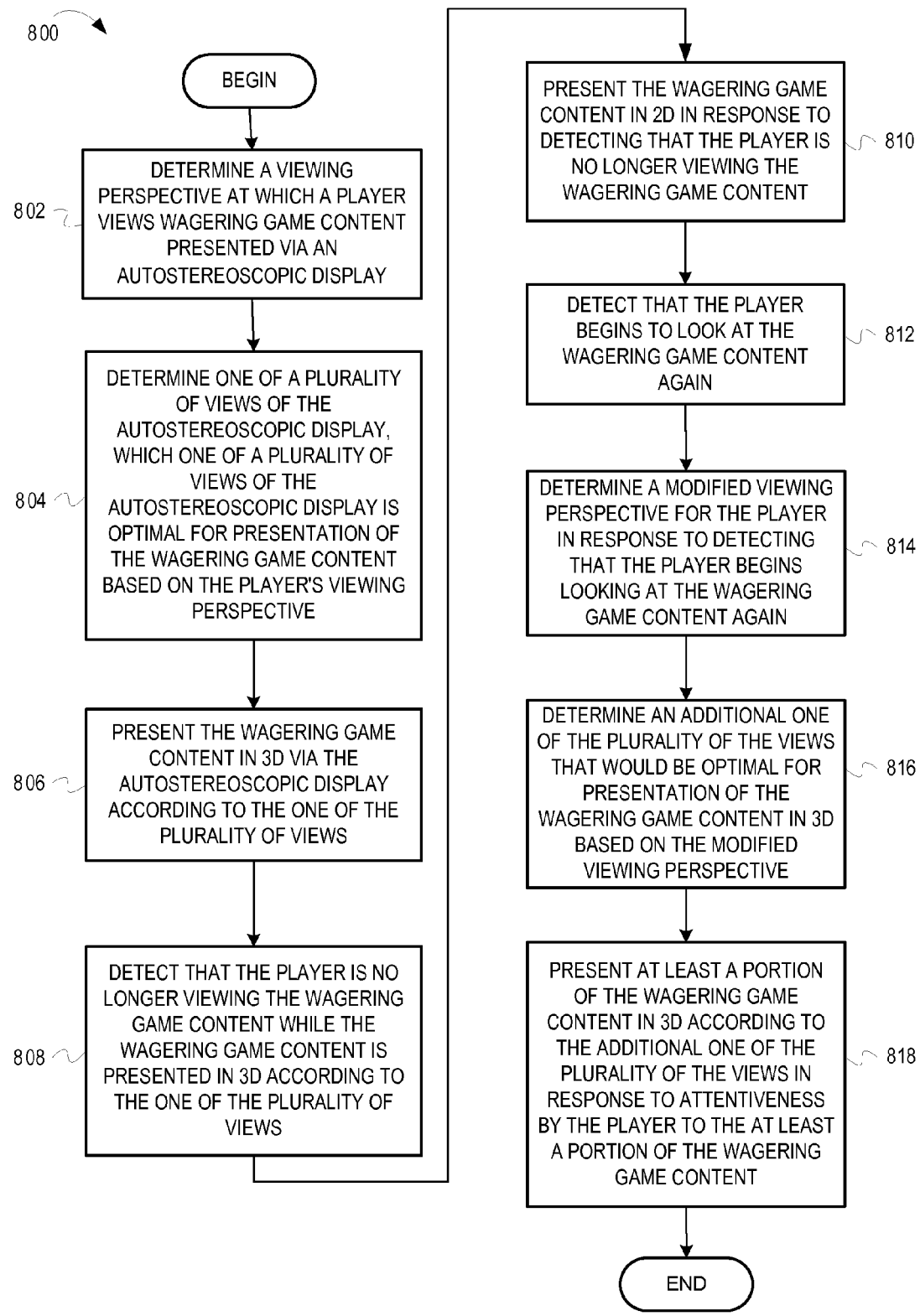
FIG. 8 is a flow diagram 800 illustrating presenting autostereoscopic wagering game content according to a degree of attentiveness to wagering game content, according to some embodiments.
Figure 9A:
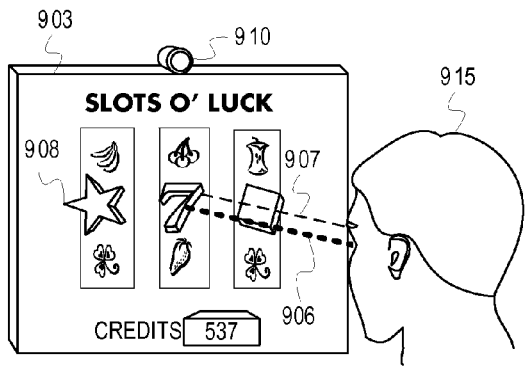
FIGS. 9A-9D are illustrations of presenting autostereoscopic wagering game content according to a degree of attentiveness to wagering game content, according to some embodiments.
Figure 9B:
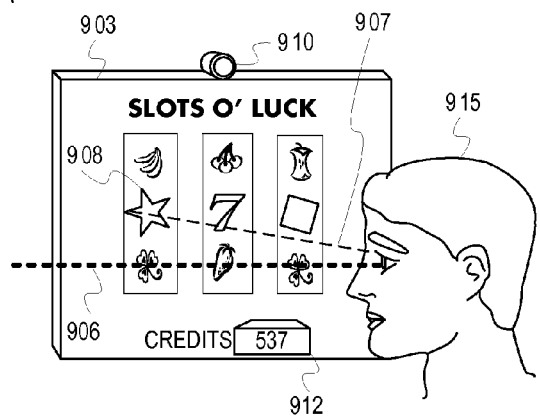

FIG. 8 is a flow diagram ("flow") 800 illustrating presenting autostereoscopic wagering game content according to a degree of attentiveness to wagering game content, according to some embodiments. FIGS. 9A-9D are conceptual diagrams that help illustrate the flow of FIG. 8, according to some embodiments. This description will present FIG. 8 in concert with FIGS. 9A-9D. In FIG. 8, the flow 800 begins at processing block 802, where a wagering game system ("system") determines a viewing perspective at which a player views wagering game content presented via an autostereoscopic display. The flow 800 continues at processing block 804, where the system determines one of a plurality of views of the autostereoscopic display, which one of a plurality of views of the autostereoscopic display is optimal for presentation of the wagering game content based on the player's viewing perspective. The flow 800 continues at processing block 806, where the system presents the wagering game content in 3D via the autostereoscopic display according to the one of the plurality of views. The flow 800 continues at processing block 808, where the system detects that the player is no longer viewing the wagering game content while the wagering game content is presented in 3D according to the one of the plurality of views. Operations associated with processing blocks 802, 804, 806 and 808 are similar to the description associated with processing blocks 502, 504, 506, and 508. In FIG. 9A, the system, via a camera 910, records a location and/or orientation of eyes of a player 915 as the player 915 looks at 3D content (i.e., one or more symbols 908) presented via an autostereoscopic display 903. The system detects a viewing perspective 906 of the player 915 and presents the 3D content using an optimal autostereoscopic view 907.

The flow 800 continues at processing block 810, where the system presents the wagering game content in 2D in response to detecting that the player is no longer viewing the wagering game content. For example, in FIG. 9B, at some point the player 915 has stopped looking at the 3D content. When the system detects that the player 915 is no longer looking at the 3D content (e.g., the system detects that the viewing perspective 906 has shifted entirely away from the 3D content), the system changes the symbols to be 2D content. In other words, the system removes the stereoscopic 3D effect (e.g., removes the dual image presentation) of the wagering game content. In some embodiments, the system makes only a portion of the 3D content 2D, such as the portion of the content that is most likely to be looked at first when the player 915 looks back at the wagering game content. For instance, in FIG. 9B, the system decides to remove a stereoscopic 3D effect from symbols 908 but leaves the presentation of a credit meter 912 in 3D in anticipation that the first thing the player 915 is likely to look at when the player 915 looks back at the autostereoscopic display 903 is one or more of the symbols 908. In another example, the system may detect that the player 915 is looking to the left of the autostereoscopic display 903. The system can predict that for the player to look back at the 3D content, the player would have to turn his head to the right, thus first viewing content on the left side of the autostereoscopic display 903. As a result, the system can decide to make only the left side of the screen 2D, while leaving the right side presented in 3D. The system may predict when the player's gaze would directly view the right side of the autostereoscopic display 903, which would still be in 3D. However, during the time that the player's gaze scans from left to right across the left side of the autostereoscopic display 903, the system can detect the position of the player's eyes and determine an optimal viewing perspective for re-presenting all of the symbols 908 content in 3D (i.e., on both left and right sides of the autostereoscopic display 903) before the player's gaze directly views the right side of the display.

Figure 9C:
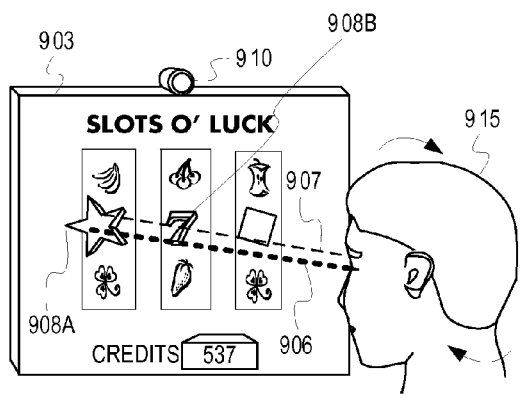
Figure 9D:
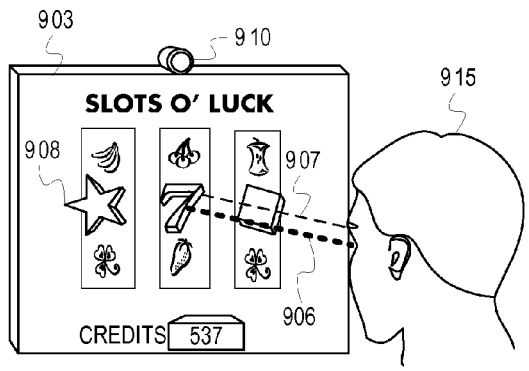

The flow 800 continues at processing block 812, where the system detects that the player begins to look at the wagering game content again. The flow 800 continues at processing block 814, where the system determines a modified viewing perspective for the player in response to detecting that the player begins looking at the wagering game content again. The flow 800 continues at processing block 816, where the system determines an additional one of the plurality of the views that would be optimal for presentation of the wagering game content in 3D based on the modified viewing perspective. The flow 800 continues at processing block 818, where the system presents at least a portion of the wagering game content in 3D according to the additional one of the plurality of the views in response to attentiveness by the player to the at least a portion of the wagering game content. For example, in FIG. 9C, the player 915 turned his head to the right and viewed one or more of the symbols 908, such as a specific symbol 908A. The system can monitor the movements or activities of the player 915, such as an amount of time that the player 915 pays attention to the symbol 908A, or any other portions of the wagering game content. For instance, if the player 915 looks back at the wagering game content when the content is in 2D, but the player 915 is distracted by something else that occurs within the casino and looks away from the autostereoscopic display 903 again, then the system can decide to not re-present the wagering game content (e.g., any of the symbols 908) in 3D until the player 915 has re-focused his attention again for a given time period (e.g., for more than five seconds). In some embodiments, the system may further monitor background activities, such as whether an important group event is occurring on a nearby display, whether there is a spike in ambient noise, or anything else within the casino that is out of the ordinary and which may distract the player 915 from focusing on the wagering game content for very long before being distracted again. Based on the background activities, the system can wait to re-present the wagering game content in 3D via the autostereoscopic display 903 until the background activities have ceased or reduced. In FIG. 9C, the system may also detect a degree of attentiveness that the player 915 has on a given element. For example, if the player 915 focuses on the symbol 908A, but not as much on symbol 908B, the system may return the symbol 908A to full 3D depth and present symbol 908 B with partial 3D depth. In some embodiments, the system may wait to return the symbol 908B to any 3D depth until the player's focus includes 908B for a longer period. In FIG. 9D, the system continues to restore 3D presentation to one or more of the symbols 908 until some or all of the wagering game content is restored to 3D presentation. In some embodiments, the system can restore a degree of 3D depth to the symbols 908 based on a degree of attentiveness. For example, if the player 915 has returned his focus to the wagering game content, then the system progressively (e.g., proportionally or gradually) restores the 3D depth effect based on a perceived degree of focus that the player 915 has on the gaming content (e.g., after the player 915 focuses on the gaming content for five seconds the system may restore 25% of the 3D depth effect, after 10 seconds the system restores 50% and so forth). In some embodiments, the system may determine whether the player spends most of his time looking at the gaming content again. In other words, if the system may determine that even if the player 915 occasionally glances away from the content, the player 915 is spending most of his time looking at the gaming content again, then the system may begin to restore a degree of 3D depth to the presentation of the gaming content. In some embodiments, the system can progressively return 3D to some elements before others. For example, if the player 915 is attentive to the gaming content intent for a certain amount of time, then the system restores the symbols 908 to 3D, and, if the system detects a longer degree of attentiveness, then the system restores the credit meter 912 to 3D, and so forth. In another example, if the player 915 is attentive to the gaming content intent for a certain amount of time, then the system restores a degree of 3D depth to the symbols 908, and, if the system detects a longer degree of attentiveness, then the system returns a degree of 3D depth to the credit meter 912, and so forth.

In some embodiments where the wagering game content requires a distinction between 3D and 2D for some gaming objects for a certain gaming purpose, then the system can refrain from making those elements 2D, but may change other elements to 2D that do not have to maintain their 3D state.

In some embodiments, the system may consider certain types of gaming events that occur, certain player settings that indicate a preference for 3D, and other conditions or factors, which may indicate a degree of priority to assign to restoration of 3D presentation. For example, in some embodiments, the system can give the player 915 an option to control a degree of 3D depth and/or to control what portions of gaming content are in 3D. Therefore, some embodiments can refer to player preference settings and, may, in some instances, based on the preferences, assign a priority for restoration to specific wagering game content based on player preference for a certain type of the specific wagering game content (e.g., restore 3D presentation to some gaming objects quicker or slower than normal because the player prefers those gaming objects to be 3D). For instance, if a player 915 has indicated in player settings he wants pay lines to pop out in 3D, then the system can assign a higher priority to re-phasing the pay lines to 3D so that the pay lines can return to a degree of 3D depth faster than for reel symbols, credit meters, or other content that can be presented in 3D. In other example, the system can determine game requirements or factors for 3D presentation (e.g., bonus symbols that have a high degree of importance for 3D presentation according to game rules or conditions). Based on the game requirements of factors, the system can re-phrase 3D content quicker than normal. In some examples, the system communicates to a gaming application a degree of 3D depth that the system will permit based on a degree of stability of the player's focus on the game as tracked. The gaming application can communicate back to the system which of the gaming elements requires a higher priority for 3D presentation so that the system can grant permission to the certain gaming elements to remain constantly in 3D or to have a higher priority for faster re-phrasing of 3D content.

Example Operating Environments

This section describes example operating environments and networks and presents structural aspects of some embodiments. More specifically, this section includes discussion about wagering game systems.

Wagering Game System Architecture

Figure 10:
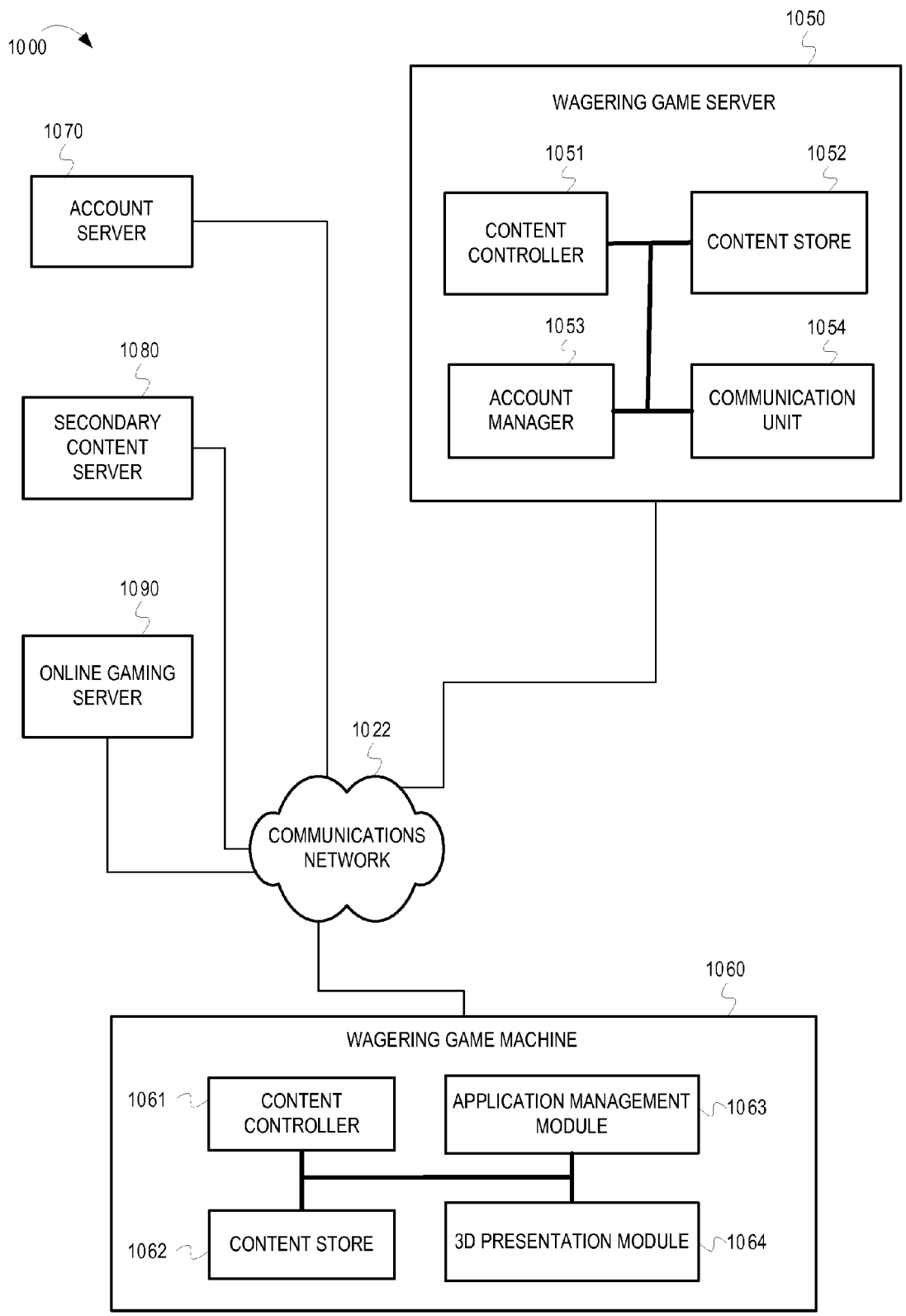
FIG. 10 is an illustration of a wagering game system architecture 1000, according to some embodiments.

FIG. 10 is a conceptual diagram that illustrates an example of a wagering game system architecture 1000, according to some embodiments. The wagering game system architecture 1000 can include an account server 1070 configured to control user related accounts accessible via wagering game networks and social networking networks. The account server 1070 can store wagering game player account information, such as account settings (e.g., settings related to default enablement of 3D modes, settings related to a type of 3D technology to use to present 3D, settings related to parallax, settings related to social contacts, etc.), preferences (e.g., player preferences 3D presentation), player profile data (e.g., name, avatar, screen name, etc.), and other information for a player's account (e.g., financial information, account identification numbers, virtual assets, social contact information, etc.). The account server 1070 can contain lists of social contacts referenced by a player account. The account server 1070 can also provide auditing capabilities, according to regulatory rules. The account server 1070 can also track performance of players, machines, and servers.

The wagering game system architecture 1000 can also include a wagering game server 1050 configured to control wagering game content, provide random numbers, and communicate wagering game information, account information, and other information to and from the wagering game machine 1060. The wagering game server 1050 can include a content controller 1051 configured to manage and control content for presentation on the wagering game machine 1060. For example, the content controller 1051 can generate game results (e.g., win/loss values), including win amounts, for games played on the wagering game machine 1060. The content controller 1051 can communicate the game results to the wagering game machine 1060. The content controller 1051 can also generate random numbers and provide them to the wagering game machine 1060 so that the wagering game machine 1060 can generate game results. The wagering game server 1050 can also include a content store 1052 configured to contain content to present on the wagering game machine 1060. The wagering game server 1050 can also include an account manager 1053 configured to control information related to player accounts. For example, the account manager 1053 can communicate wager amounts, game results amounts (e.g., win amounts), bonus game amounts, etc., to the account server 1070. The wagering game server 1050 can also include a communication unit 1054 configured to communicate information to the wagering game machine 1060 and to communicate with other systems, devices and networks.

The wagering game system architecture 1000 can also include a wagering game machine 1060 configured to present wagering games and receive and transmit information to coordinate, present, and control presentation of 3D elements in 2D gaming environments according to some embodiments. The wagering game machine 1060 can include a content controller 1061 configured to manage and control content and presentation of content on the wagering game machine 1060. The wagering game machine 1060 can also include a content store 1062 configured to contain content to present on the wagering game machine 1060. The wagering game machine 1060 can also include an application management module 1063 configured to manage multiple instances of gaming applications. For example, the application management module 1063 can be configured to launch, load, unload and control applications and instances of applications. The application management module 1063 can launch different software players (e.g., a Microsoft® Silverlight™ Player, an Adobe® Flash® Player, etc.) and manage, coordinate, and prioritize what the software players do. The application management module 1063 can also coordinate instances of the server applications in addition to local copies of applications. The application management module 1063 can control window locations on a wagering game screen or display for the multiple gaming applications. In some embodiments, the application management module 1063 can manage window locations on multiple displays including displays on devices associated with and/or external to the wagering game machine 1060 (e.g., a top display and a bottom display on the wagering game machine 1060, a peripheral device connected to the wagering game machine 1060, a mobile device connected to the wagering game machine 1060, etc.). The application management module 1063 can manage priority or precedence of client applications that compete for the same display area. For instance, the application management module 1063 can determine each client application's precedence. The precedence may be static (i.e. set only when the client application first launches or connects) or dynamic. The applications may provide precedence values to the application management module 1063, which the application management module 1063 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 1063 of its current presentation state. The applications may provide presentation state values to the application management module 1063, which the application management module 1063 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 1063 can be pre-configurable. The system can provide controls and interfaces for operators to control screen layouts and other presentation features for the configuring the application management module 1063. The application management module 1063 can communicate with, and/or be a communication mechanism for, a base game stored on a wagering game machine. For example, the application management module 1063 can communicate events from the base game such as the base game state, pay line status, bet amount status, etc. The application management module 1063 can also provide events that assist and/or restrict the base game, such as providing bet amounts from secondary gaming applications, inhibiting play based on gaming event priority, etc. The application management module 1063 can also communicate some (or all) financial information between the base game and other applications including amounts wagered, amounts won, base game outcomes, etc. The application management module 1063 can also communicate pay table information such as possible outcomes, bonus frequency, etc.

In some embodiments, the application management module 1063 can control different types of applications. For example, the application management module 1063 can perform rendering operations for presenting applications of varying platforms, formats, environments, programming languages, etc. For example, the application management module 1063 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 1063 can include a portable virtual machine capable of generating and executing code for the varying platforms, formats, environments, programming languages, etc. The application management module 1063 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 1060 can also include a 3D presentation module 1064 configured to control presentation of 3D gaming objects.

The wagering game system architecture 1000 can also include a secondary content server 1080 configured to provide content and control information for secondary games and other secondary content available on a wagering game network (e.g., secondary wagering game content, promotions content, advertising content, player tracking content, web content, etc.). The secondary content server 1080 can provide "secondary" content, or content for "secondary" games presented on the wagering game machine 1060. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 1080 can provide and control content for community games, including networked games, social games, competitive games, or any other game that multiple players can participate in at the same time. In some embodiments, the secondary content server 1080 can control and present an online website that hosts wagering games. The secondary content server 1080 can also be configured to present multiple wagering game applications on the wagering game machine 1060 via a wagering game website, or other gaming-type venue accessible via the Internet. The secondary content server 1080 can host an online wagering website and/or a social networking website. The secondary content server 1080 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 1080 can be configured to integrate 3D wagering game elements in 2D gaming environments. In some embodiments, the secondary content server 1080 can also host social networking accounts, provide social networking content, control social networking communications, store associated social contacts, etc. The secondary content server 1080 can also provide chat functionality for a social networking website, a chat application, or any other social networking communications mechanism. In some embodiments, the secondary content server 1080 can utilize player data to determine marketing promotions that may be of interest to a player account. The secondary content server 1080 can also analyze player data and generate analytics for players, group players into demographics, integrate with third party marketing services and devices, etc. The secondary content server 1080 can also provide player data to third parties that can use the player data for marketing.

The wagering game system architecture 1000 can also include an online gaming server 1090 configured to control and present an online website that hosts wagering games. The online gaming server 1090 can also be configured to present multiple wagering game applications on the wagering game machine 1060, on a mobile computing device, on a personal computer, etc. via a wagering game website, or other gaming-type venue accessible via the Internet. The online gaming server 1090 can host an online wagering website and/or a social networking website. The online gaming server 1090 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.).

Each component shown in the wagering game system architecture 1000 is shown as a separate and distinct element connected via a communications network 1022. However, some functions performed by one component could be performed by other components. For example, the wagering game server 1050 can also be configured to perform functions of the application management module 1063, the 3D presentation module 1064, the secondary content server 1080, the account server 1070, the web server 1090, and other network elements and/or system devices. Furthermore, the components shown may all be contained in one device, but some, or all, may be included in, or performed by, multiple devices, as in the configurations shown in FIG. 10 or other configurations not shown. For example, the account manager 1053 and the communication unit 1054 can be included in the wagering game machine 1060 instead of, or in addition to, being a part of the wagering game server 1050. Further, in some embodiments, the wagering game machine 1060 can determine wagering game outcomes, generate random numbers, etc. instead of, or in addition to, the wagering game server 1050.

The wagering game machines described herein (e.g., wagering game machine 1060) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 1000 can be implemented as software, hardware, any combination thereof, or other forms of embodiments not listed. For example, any of the network components (e.g., the wagering game machines, servers, etc.) can include hardware and

Generating 3D Wagering Game Content

Figure 11A:
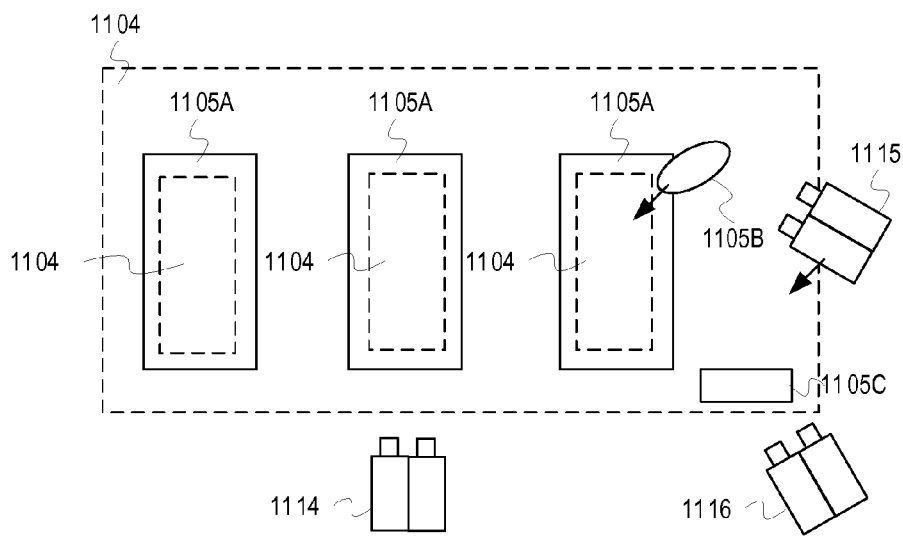
FIGS. 11A-11C are illustrations of generating 3D wagering game content, according to some embodiments.
Figure 11B:
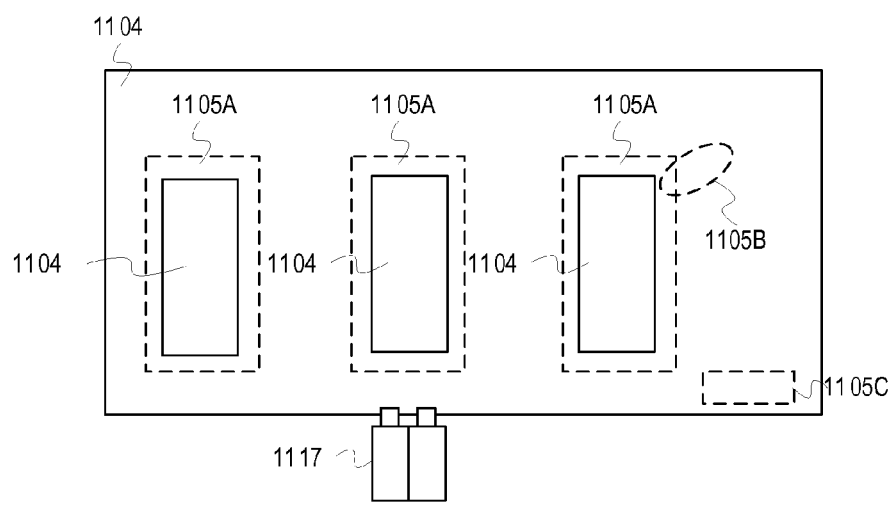
Figure 11C:
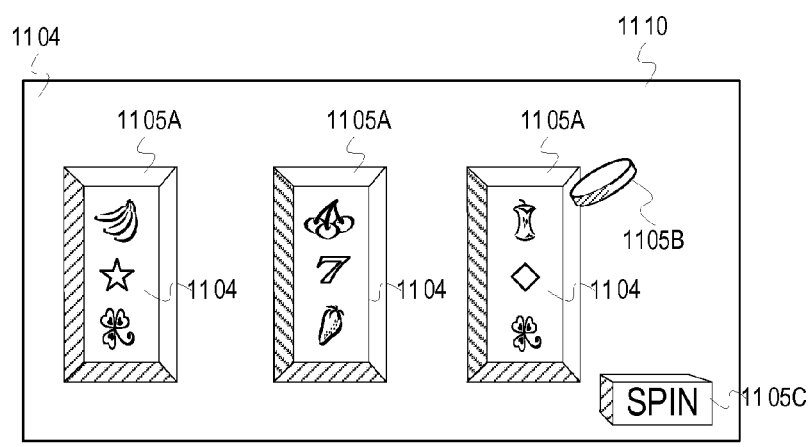

FIGS. 11A-11C are conceptual diagrams that illustrate an example of generating 3D wagering game content, according to some embodiments. FIGS. 11A-11C also illustrate an example of generating a composite image of content from 2D regions and 3D regions according to some embodiments. In FIG. 11A, a wagering game system (e.g., a wagering game machine's graphics unit) creates a virtual 3D game space that includes regions 1105A, 1105B, 1105C and 1104. Regions 1105A, 1105B, and 1105C are similar to regions 105 in FIG. 1 and region 1104 is similar to regions 104 described in FIG. 1. In FIG. 11A, a first set of virtual cameras 1114 are positioned and oriented to capture images of objects within regions 1105A. The first set of virtual cameras 1114 behave like real-world cameras, as they may have focal length, depth of field, shutter speed, resolution, aperture size, etc. The first set of virtual cameras 1114 can record images at a rate that, upon playback, appears continuous, such as a video camera does. For stereoscopic 3D, two virtual cameras are necessary. A first camera of the first set of the virtual cameras 1114 records a first image for presentation to a viewer's left eye, whereas a second camera of the first set of virtual cameras 1114 records a second image for presentation to the viewer's right eye. The regions 1105B and 1105C, as well as regions 1104, are invisible to the first set of virtual cameras 1114. The system stores the images of regions 1105A in a buffer.

A second set of virtual cameras 1115 (similar to the first set of virtual cameras 1114) are positioned and oriented to capture images of the second region 1105B. Regions 1105A, 1105C and 1104 are invisible to the second set of virtual cameras 1115. A third set of virtual cameras 1116 (similar to the first set of virtual cameras 1114) are positioned and oriented to capture images of region 1105C. Regions 1105A, 1105B, and 1104 are invisible to the third set of virtual cameras 1116. The system renders the regions 1105A, 1105B, and 1105C as stereoscopic 3D images and buffers the 3D images in one or more graphics buffers. The stereoscopic 3D images in the graphics buffer(s) includes first 2D images for presentation to a viewer's left eye, and a second 2D images for presentation to the viewer's right eye. When presented on a stereoscopic 3D display device, the first and second images appear as a stereoscopic 3D image, having an illusion of depth.

In FIG. 11B, a fourth set of virtual cameras 1117 (similar to the first set of virtual cameras 1114) are positioned and oriented to capture images of regions 1104. Regions 1105A, 1105B, and 1105C are invisible to fourth virtual cameras 1117. The system renders the regions 1104 as a 2D image (i.e., without stereoscopic depth) and buffers the 2D image. In some embodiments, only one of the virtual cameras 1117 is used to capture 2D content as only one perspective would need to be recorded and presented to a user's eyes to depict a 2D object.

In some embodiments, the sets of virtual cameras (e.g., sets of virtual cameras 1114, 1115, 1116, and 1117) are configured to capture images of only objects that are within their respective assigned region (e.g., respectively the first set of virtual cameras 1114 are assigned to regions 1105A, the second set of virtual cameras 1115 are assigned to region 1105B, the third set of virtual cameras 1116 are assigned to region 1105C, and the fourth set of virtual cameras 1117 are assigned to regions 1104). The objects within coordinates of a given region may include metadata identifiers that are assigned to the region, and the virtual cameras to which the region are assigned are configured to record only the objects whose identifiers are within the coordinates of the region. All other objects that are outside of the region are invisible to sets of virtual cameras assigned to that region. In some embodiments, the sets of virtual cameras are configured to move if their respective regions move. In some embodiments, one or more of the regions 1105A, 1105B, and 1105C may move around and overlap. In such cases, the system can coordinate which of the sets of virtual cameras will record objects within the intersection of the overlapped regions. In some embodiments, the system transfers objects from one region to another (e.g., modifies the metadata identifiers of the objects to be within the region of another of the virtual cameras). In some embodiments, the system can assign more than one set of virtual cameras to any given region, and the system can further divide regions into sub-regions dynamically. In some embodiments, a grid of virtual cameras is assigned to given regions that abut and encompass the entire viewing area of a display. The system can coordinate movement of objects from one region to another, and turn on and off sets of virtual cameras for recording the objects when the objects pass from one region into another.

In FIG. 11C, the system creates a composite image 1110. The composite image 1110 is comprised of rendered 3D content from regions 1105A, 1105B, and 1105C and rendered 2D content from regions 1104 via a display capable of presenting both 2D and 3D images. In FIGS. 11A-11C, some of the regions 1104 are contained within the regions 1105A such that 2D content can be surrounded by 3D content. The system can utilize multiple buffers and overlay images within the buffers to generate the composite image 1110. For example, the system can include a separate buffer for each set of virtual cameras. The objects contained within the regions assigned to the virtual cameras. Each set of virtual cameras record and store in their respective buffers the images of the objects in their assigned regions according to a common timeline. The system then concurrently overlays each of the buffered images stored in each of the buffers and presents them according to the common timeline.

It should be noted that in some embodiments, like in FIGS. 11A-11C, multiple sets of virtual cameras are used concurrently, however in other embodiments only one set of virtual cameras is used at different times and buffered according to separate timelines. The system later synchronizes the timelines and overlays the buffered images according to a synchronized timelines.

In some embodiments (e.g., some embodiments described in FIGS. 8 and 9A-9D) when the system changes presentation of some gaming content from 3D to 2D, the system can align virtual cameras so they are coincident. For example, in FIGS. 11A-11C, the system can align the individual cameras from each set of virtual cameras 1114, 1115, 1116 (i.e., move each camera from each set of virtual cameras together, such as moving together the two cameras from the first set of the virtual cameras 1114 so that they capture only one perspective of the content they are assigned to). When the system renews tracking, and then gradually phases back into 3D (i.e., progressively restores 3D depth), the system can gradually re-space or re-separate the two cameras from the set until the cameras have re-spaced to an optimal, default position for presentation of the 3D content. For example, in FIGS. 11A-11C, the system can gradually re-separate the camera pairings for any of the sets of virtual cameras 1114, 1115, and 1116. In some embodiments, instead of, or in additional to, moving the spacing of the sets of virtual cameras 1114, 1115, and 1116, the system can modify a z-depth of a gaming object to cause the gaming object to appear to move closer to, or further away from, the player in 3D space.

Wagering Game Machine Architecture

Figure 12:
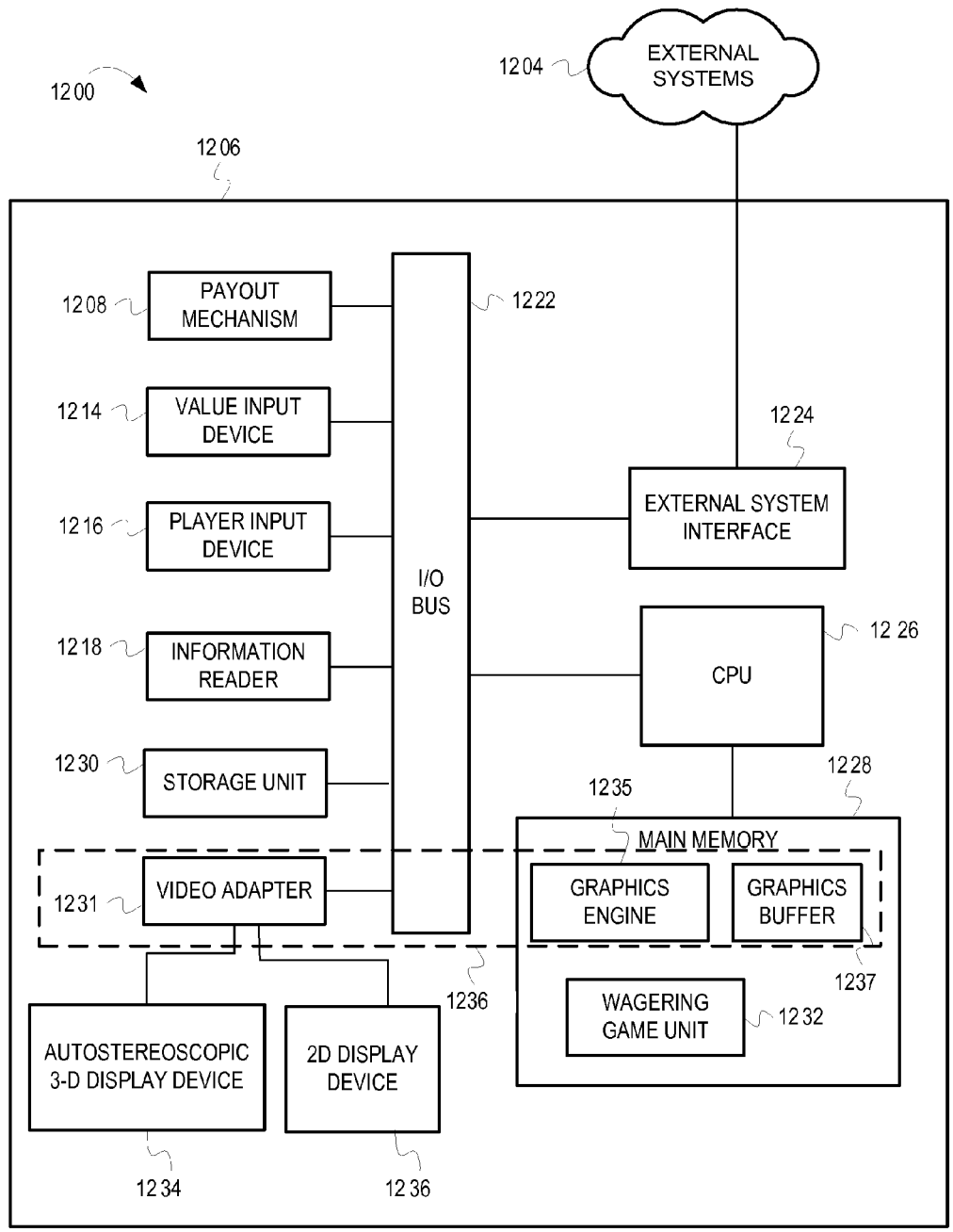
FIG. 12 is an illustration of a wagering game machine architecture 1200, according to some embodiments.

FIG. 12 is a block diagram illustrating a wagering game machine architecture, according to example embodiments of the invention. As shown in FIG. 12, the wagering game machine architecture 1200 includes a wagering game machine 1206, which includes a central processing unit (CPU) 1226 connected to main memory 1228. The CPU 1226 can include one or more processors, such as one or more Intel® Pentium processors, Intel® Core 2 Duo processors, AMD Opteron™ processors, UltraSPARC processors, etc. The main memory 1228 includes a wagering game unit 1232. In one embodiment, the wagering game unit 1232 can present wagering games, such as video poker, video black jack, video slots, video lottery, etc., in whole or part.

The main memory 1228 also includes a graphics engine 1235 that can use stereoscopic 3D graphics and 2D graphics to present composite images that include multiple views of a virtual 3D wagering game environment. The graphics engine 1235 can operate in concert with a video adapter 1231 and graphics buffer 1237, which together make up a graphics unit 1236. The graphics unit 1236 presents composite images on an autostereoscopic 3D display device 1234. The video adapter 1231 is also connected to a 2D display device.

Embodiments of the stereoscopic 3D display device can support any of the following technologies: anaglyph images, polarized projections, autostereoscopic displays, computer-generated holography, volumetric displays, infrared laser projections, side-by-side viewing, autostereograms, pulfrich effects, prismatic & self-masking crossview glasses, lenticular prints, displays with filter arrays, wiggle stereoscopy, active 3D viewers (e.g., liquid crystal shutter glasses, red eye shutterglasses, virtual reality headsets, personal media viewers, etc.), passive 3D viewers (e.g., linearly polarized glasses, circularly polarized glasses, interference filter technology glasses, complementary color anaglyphs, compensating diopter glasses for red-cyan method, ColorCode 3D, ChromaDepth method and glasses, Anachrome "compatible" color anaglyph method, etc.), 3D televisions, etc.

Anaglyph images, for example, are used to provide a stereoscopic 3D effect when viewed with glasses where the two lenses are different (usually chromatically opposite) colors, such as red and cyan. The anaglyph images are made up of two color layers (one for each eye), superimposed, but offset with respect to each other to produce a depth effect when viewed through the glasses. Usually the main subject is in the center, while the foreground and background are shifted laterally in opposite directions. When the two color layers are viewed simultaneously through the anaglyph glasses, an integrated stereoscopic image appears. The visual cortex of the brain fuses the two images into the perception of a three dimensional scene or composition.

In another example, polarized 3D glasses create the illusion of three-dimensional images by restricting the light that reaches each eye, an example of stereoscopy that exploits the polarization of light. To present a stereoscopic video, two images are projected superimposed onto the same screen through different polarizing filters. The viewer wears eyeglasses that also contain a pair of different polarizing filters. Each of the viewer's eyes sees a different image as each filter passes only that light which is similarly polarized and blocks the light polarized in the opposite direction. The use of the polarized 3D glasses thus produces a three-dimensional effect by projecting the same scene into both the viewer's eyes, but depicted from slightly different perspectives. Since no head tracking is involved, several people can view the stereoscopic images at the same time.

In another example, autostereoscopic displays use optical trickery at the display, rather than worn by the user, to ensure that each eye sees the appropriate image. Autostereoscopic displays generally allow the user to move their head a certain amount without destroying the illusion of depth.

In another example, automultiscopic displays include view-dependent pixels with different intensities and colors based on the viewing perspective (i.e., a number of different views of the same scene can be seen by moving horizontally around the display). In most automultiscopic displays the change of view is accompanied by the breakdown of the illusion of depth, but some displays exist which can maintain the illusion as the view changes.

In another example, computer-generated holography utilizes devices that create a light field identical to that which would emanate from an original scene, with both horizontal and vertical parallax across a large range of viewing perspectives.

Volumetric displays are yet another example, where some physical mechanism is used to display points of light within a volume. Such displays use voxels instead of pixels. Volumetric displays include multiplanar displays, which have multiple display planes stacked up, and rotating panel displays, where a rotating panel sweeps out a volume.

Other technologies, for example, may include projecting light dots in the air above a device. An infrared laser is focused on the destination in space, generating a small bubble of plasma that emits visible light.

The CPU 1226 is also connected to an input/output (I/O) bus 1222, which can include any suitable bus technologies, such as an AGTL+ frontside bus and a PCI backside bus. The I/O bus 1222 is connected to a payout mechanism 1208, value input device 1214, player input device 1216, information reader 1218, storage unit 1230, and the video adapter. The player input device 1216 can include the value input device 1214 to the extent the player input device 1216 is used to place wagers. The I/O bus 1222 is also connected to an external system interface 1224, which is connected to external systems 1204 (e.g., wagering game networks).

In one embodiment, the wagering game machine 1206 can include additional peripheral devices and/or more than one of each component shown in FIG. 12. For example, in one embodiment, the wagering game machine 1206 can include multiple external system interfaces 1224 and/or multiple CPUs 1226. In one embodiment, any of the components can be integrated or subdivided.

Furthermore, any component of the wagering game machine 1206 can include hardware, firmware, and/or machine-readable storage media including instructions for performing the operations described herein.

Wagering Game System

Figure 13:
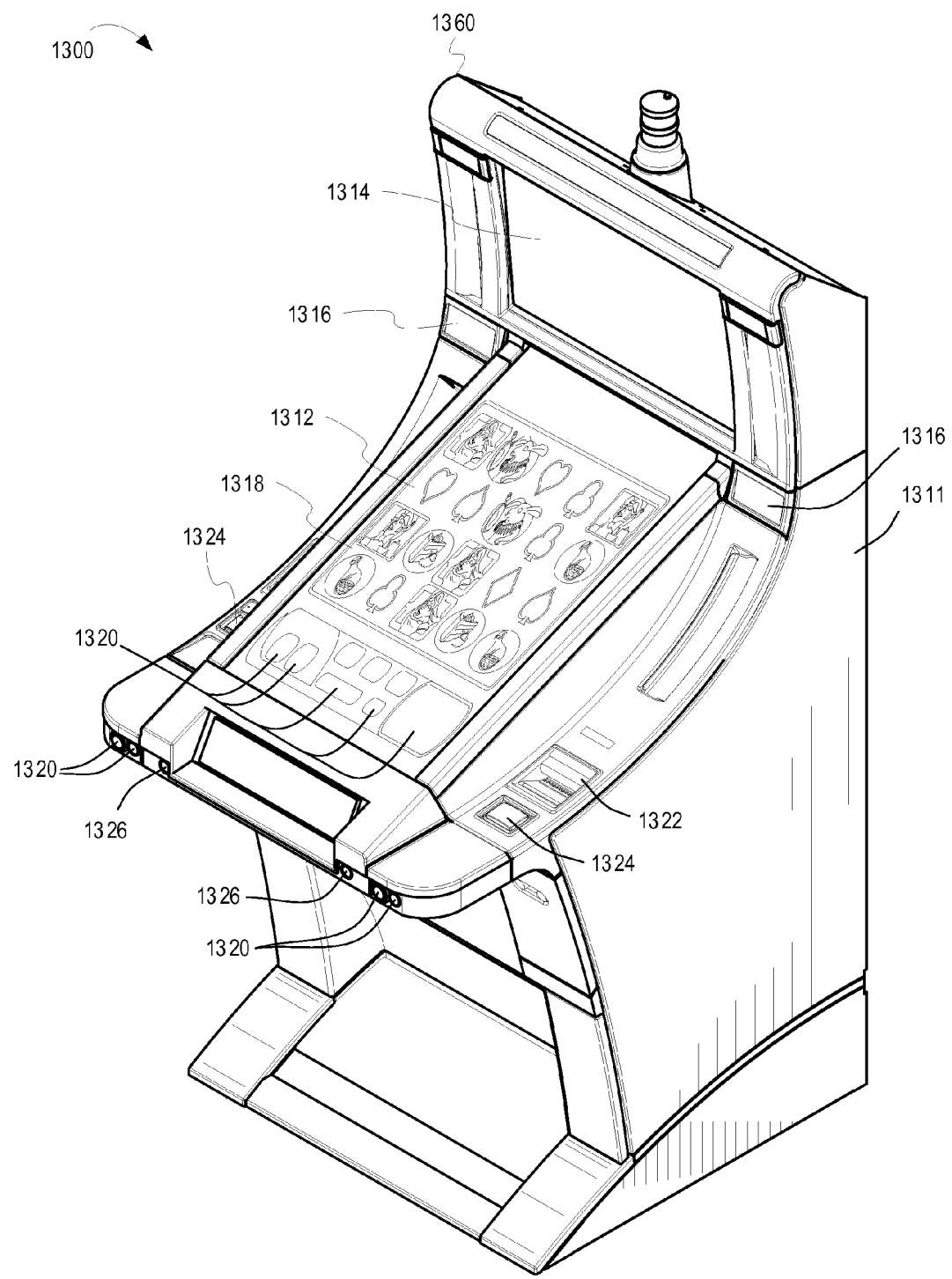
FIG. 13 is an illustration of a wagering game system 1300, according to some embodiments.

FIG. 13 is a conceptual diagram that illustrates an example of a wagering game system 1300, according to some embodiments. In FIG. 13, the wagering game system 1300 includes a wagering game machine 1360 similar to those used in gaming establishments, such as casinos. The wagering game machine 1360 may, in some examples, be referred to as a gaming terminal or an electronic gaming machine. The wagering game machine 1360 may have varying structures and methods of operation. For example, the wagering game machine 1360 may include electromechanical components configured to play mechanical slots. In another example, the 1360 includes electronic components configured to play a video casino game, such as slots, keno, poker, blackjack, roulette, craps, etc. The wagering game machine 1360 is depicted as a floor-standing model. However, other examples of wagering game machines include handheld mobile units, bartop models, workstation-type console models, etc. Further, the wagering game machine 1360 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 1360 illustrated in FIG. 13 comprises a cabinet 1311 that may house various input devices, output devices, and input/output devices. By way of example, the wagering game machine 1360 includes a primary display area 1312, a secondary display area 1314, and one or more audio speakers 1316. The primary display area 1312 or the secondary display area 1314 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 1312 or the secondary display area 1314 includes mechanical reels to display a wagering game outcome. In some example, the primary display area 1312 or the secondary display area 1314 present a transmissive video display disposed in front of a mechanical-reel display to portray a video image superimposed upon the mechanical-reel display. In FIG. 13, the wagering game machine 1360 is a "slant-top" version in which the primary display 1312 is slanted (e.g., at about a thirty-degree angle toward the player of the wagering game machine 1360). Another example of wagering game machine 1360 is an "upright" version in which the primary display 1314 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1360. The wagering game machine 1360 includes a touch screen(s) 1318 mounted over the primary or secondary areas, buttons 1320 on a button panel, bill validator 1322, information reader/writer(s) 1324, and player-accessible port(s) 1326 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 1318, buttons 1320, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system, said method comprising:
   detecting, according to electronic analysis of player movements via a perspective tracking device of the gaming system, a player viewing perspective as at least a portion of wagering game content presented via an autostereoscopic display of a wagering game machine is being observed;
   determining, via an electronic processing unit of the gaming system, an autostereoscopic view of the at least the portion of the wagering game content for the autostereoscopic display based on the player viewing perspective;
   graphically rendering, via a graphical processing device, the at least the portion of the wagering game content with a degree of stereoscopic three-dimensional effect for the autostereoscopic view;

detecting, via the perspective tracking device, a change in the player viewing perspective;

determining, according to the change in the player viewing perspective, that the at least the portion of the wagering game content is not being observed; and freezing, via the graphical processing device, a rendered presentation state of the at least the portion of the wagering game content with the degree of the stereoscopic three-dimensional effect according to the autostereoscopic view in response to the determining that at least the portion of the wagering game content is not being observed.

2. The method of claim 1, wherein the determining, according to the change in the player viewing perspective, that the at least the portion of the wagering game content is not being observed comprises:

tracking the change to the player viewing perspective as the player viewing perspective scans across an area of the autostereoscopic display that presents the at least the portion of the wagering game content; and determining, based on the change to the player viewing perspective, when a player last looks at the at least the portion of the wagering game content.

3. The method of claim 2, wherein the freezing the rendered presentation state of the at least the portion of the wagering game content with the degree of the stereoscopic three-dimensional effect according to the autostereoscopic view comprises freezing the rendered presentation state of the at least the portion of the wagering game content as the at least the portion of the wagering game content appeared via the autostereoscopic display when the player last looked at the at least the portion of the wagering game content.

4. The method of claim 2, wherein the freezing the rendered presentation state of the at least the portion of the wagering game content with the degree of the stereoscopic three-dimensional effect according to the autostereoscopic view comprises:

storing one or more parameters of the autostereoscopic view at a last moment that the player looks at the at least the portion of the wagering game content; and presenting the at least the portion of the wagering game content using the one or more parameters while the player is looking away from the at least the portion of the wagering game content.

5. The method of claim 4, wherein the one or more parameters comprise one or more of a direction at which light is focused through a lenticular lens corresponding to the at least the portion of the wagering game content, a position of parallax barriers corresponding to the at least the portion of the wagering game content, and a configuration of images within a graphical buffer that correspond to the at least the portion of the wagering game content.

6. The method of claim 4, wherein the storing the one or more parameters of the autostereoscopic view at the last moment that the player looks at the at least the portion of the wagering game content comprises:

determining a frustum corresponding to a position of at least one eye of the player in relation to a boundary of the autostereoscopic display at the last moment that the player looks at the at least the portion of the wagering game content; and storing data associated with the frustum within a memory associated with the wagering game machine.

7. One or more non-transitory, machine-readable storage media having instructions stored thereon, which when executed by a set of one or more processors of a gaming system cause the set of one or more processors to perform operations comprising:

tracking, via a player perspective tracking device of the gaming system, a player viewing perspective based on physical movements of a player at a wagering game machine in a casino;

graphically rendering, via a graphical processing device of the gaming system, wagering game content with a degree of stereoscopic three-dimensional effect via an autostereoscopic display according to a first autostereoscopic view while the wagering game content is viewed from the player viewing perspective as the player viewing perspective is about to move away from an area of the autostereoscopic display that presents at least a portion of the wagering game content;

detecting, via the player perspective tracking device, that the player viewing perspective has moved away from the area of the autostereoscopic display that presents the at least the portion of the wagering game content, wherein the at least the portion of the wagering game content is no longer being viewed from the player viewing perspective; and freezing a rendered presentation state of the at least the portion of the wagering game content with the degree of the stereoscopic three-dimensional effect according to the first autostereoscopic view in response to the detecting that the player viewing perspective has moved away from the area of the autostereoscopic display that presents the at least a portion of the wagering game content.

8. The one or more non-transitory, machine-readable storage media of claim 7 wherein the operation for detecting that the player viewing perspective has moved away from the area of the autostereoscopic display that presents the at least the portion of the wagering game content includes operations comprising:

recording one or more images of one or more facial features of the player as the player views the wagering game content via the autostereoscopic display;

determining, via analysis of the one or more images, that a gaze of the player is moving in a direction away from the area of the autostereoscopic display that includes the at least the portion of the wagering game content; and determining, via further analysis of the one or more images, a moment when the gaze of the player is no longer looking at the area of the autostereoscopic display that includes the at least the portion of the wagering game content.

9. The one or more non-transitory, machine-readable storage media of claim 7, wherein the operation for presenting the wagering game content with the degree of stereoscopic three-dimensional effect via the autostereoscopic display according to the first autostereoscopic view while the wagering game content is viewed from the player viewing perspective as the player viewing perspective is about to move away from the area of the autostereoscopic display that presents the at least the portion of the wagering game content includes operations comprising:

determining that the at least the portion of the wagering game content is presented according to the first autostereoscopic view at a moment before the player looks away from the at least the portion of the wagering game content;

computing a viewing frustum associated with the first autostereoscopic view; and presenting the at least the portion of the wagering game content using the viewing frustum.

10. The one or more non-transitory, machine-readable storage media of claim 9 wherein the operation for presenting the at least the portion of the wagering game content with the degree of the stereoscopic three-dimensional effect according to the first autostereoscopic view in response to the detecting that the player viewing perspective has moved away from the area of the autostereoscopic display that presents the at least the portion of the wagering game content includes operations comprising:
   storing the viewing frustum in response to the determining that the first autostereoscopic view is presented at the moment before the player looks away from the at least the portion of the wagering game content; and
   freezing the rendered presentation state of the at least the portion of the wagering game content with the degree of the stereoscopic three-dimensional effect according the viewing frustum after the player looks away from the wagering game content.

11. The one or more non-transitory, machine-readable storage media of claim 7, wherein the first autostereoscopic view is offset from a second autostereoscopic view that corresponds to a viewing perspective from a first position in front of the autostereoscopic display different from a second position associated with the player when the player viewing perspective has moved away from the area of the autostereoscopic display that presents the at least the portion of the wagering game content.

12. A gaming system comprising:
   at least one autostereoscopic display device configured to display a wagering game, the at least one autostereoscopic display device being capable of autostereoscopic, three-dimensional visual effects;
   at least one processor;
   a player perspective tracking device; and
   at least one memory device configured to store instructions which, when executed by the at least one processor, cause the gaming system to perform operations to track, via the player perspective tracking device, a player viewing perspective based on physical movements of a player at a wagering game machine in a casino,
      graphically render wagering game content for the wagering game with a degree of a stereoscopic three-dimensional effect according to a first autostereoscopic view for the at least one autostereoscopic display device, wherein the first autostereoscopic view is based on the player viewing perspective of the wagering game content while the player is at a first position relative to the wagering game machine,
      determine that the player viewing perspective focuses away from the wagering game content,
      track player movements to second positions relative to the wagering game machine while the player viewing perspective is focused away from the wagering game content,
      compute a modification of the player viewing perspective based on the player movements,
      determine additional autostereoscopic views for presentation of the wagering game content according to additional degrees of stereoscopic three-dimensional effect based on the modification of the player viewing perspective, and
      present at least a portion of the wagering game content according to the additional degrees of stereoscopic three-dimensional effect using the additional autostereoscopic views while the player viewing perspective is focused away from the wagering game content.

13. The gaming system of claim 12, wherein the at least one memory device configured to store instructions which, when executed by the at least one processor, cause the gaming system to perform the operation to determine the additional autostereoscopic views is configured store instructions which, when executed by the at least one processor, further cause the gaming system to perform operations to,
   for each of the additional autostereoscopic views:
      detect a field of view of the player from a given location in front of the at least one autostereoscopic display device, wherein the field of view is directed away from the at least one autostereoscopic display device;
      determine that the at least the portion of the wagering game content is a portion of the content closest to an edge of the field of view; and
      determine one of the additional autostereoscopic views that corresponds to a default presentation of the at least the portion of the wagering game content when viewed from the given location.

14. The gaming system of claim 13, wherein the at least one memory device configured to store instructions which, when executed by the at least one processor, cause the gaming system to perform the operation to determine that the at least the portion of the wagering game content is a portion of the content closest to the edge of the field of view is further configured to store instructions which, when executed by the at least one processor, cause the gaming system to perform operations to:
   determine a point on the at least one autostereoscopic display device that is aligned with the field of view, and
   select the at least the portion of the wagering game content that is closest to the point on the at least one autostereoscopic display device.

15. The gaming system of claim 12, wherein the at least one memory device is configured to store instructions which, when executed by the at least one processor, cause the gaming system to further perform operations to:
   change presentation of an additional portion of the wagering game content from a stereoscopic three-dimensional presentation to a two-dimensional presentation while the player viewing perspective is focused away from the wagering game content;
   determine that the player viewing perspective returns focus to the at least the portion of the wagering game content; and
   return presentation of the additional portion of the wagering game content to the stereoscopic three-dimensional presentation.

16. A gaming apparatus comprising:
   at least one input device configured to receive an indication of a wager to play a wagering game;
   at least one display device configured to display the wagering game, the at least one display device being capable of stereoscopic, three-dimensional visual effects;
   a player perspective tracking device configured to track a player viewing perspective based on physical movements of a player at a wagering game machine in a casino;
   at least one processor; and
   at least one memory device configured to store instructions which, when executed by the at least one processor, cause the gaming apparatus to perform operations to
      graphically render wagering game content for the wagering game with a degree of stereoscopic three-dimensional effect according to an autostereoscopic view for an the at least one display device, wherein the autostereoscopic view is based on the player viewing perspective directed at the wagering game content while a gaze of the player is in a first position relative to the wagering game content, detect, via the player perspective tracking device, that the gaze of the player moves to a second position relative to the wagering game content, determine, based on the gaze of the player moving to the second position, that the player viewing perspective is directed away from at least a portion of the wagering game content, present a first graphical rendering of the at least the portion of the wagering game content according to a two-dimensional presentation in response to determining that the player viewing perspective is directed away from the at least the portion of the wagering game content, detect, via the player perspective tracking device, that the gaze of the player moves back to the first position relative to the wagering game content, determine, based on the gaze of the player returning to the first position, that the player viewing perspective is re-directed at the at least the portion of the wagering game content, and present a second graphical rendering of the at least the portion of the wagering game content according to the stereoscopic three-dimensional effect in response to determining that the player viewing perspective is re-directed at the at least the portion of the wagering game content.

17. The gaming apparatus of claim 16, wherein the at least one memory device is configured to store instructions which, when executed by the at least one processor, cause the gaming apparatus perform operations to determine a degree of player attentiveness to the at least the portion of the wagering game content in response to determination that the player viewing perspective is re-directed at the wagering game content, and modify the degree of the stereoscopic three-dimensional effect according to the degree of the player attentiveness.

18. The gaming apparatus of claim 17, wherein the at least one memory device configured to store instructions which, when executed by the at least one processor, cause the apparatus to perform the operation to determine the degree of player attentiveness is configured to store instructions which, when executed by the at least one processor, cause the gaming apparatus to further perform operations to:

detect an amount of time that the gaze of the player is focused upon the at least the portion of the wagering game content after determination that that the player viewing perspective is re-directed at the at least the portion of the wagering game content; and determine that the amount of time meets a threshold time limit, wherein the degree of the stereoscopic three-dimensional effect is based on the amount of time.

19. The gaming apparatus of claim 17, wherein the at least one memory device configured to store instructions which, when executed by the at least one processor, cause the gaming apparatus to perform the operation to present the second graphical rendering of the at least the portion of the wagering game content is configured to store instructions which, when executed by the at least one processor, cause the apparatus to further perform operations to progressively restore a degree of a stereoscopic depth effect to the at least the portion of the wagering game content proportional to the degree of player attentiveness.

20. The gaming apparatus of claim 16, wherein the at least one memory device is configured to store instructions which, when executed by the at least one processor, cause the gaming apparatus to further perform an operation to select the at least the portion of the wagering game content based on one or more of an importance of a gaming event that occurs during a wagering game session, a likelihood that the gaze of the player will be upon the at least the portion of the wagering game content, and a player preference for presentation of a type of content associated with the at least the portion of the wagering game content.

21. The gaming apparatus of claim 16, wherein the at least one memory device is configured to store instructions which, when executed by the at least one processor, cause the gaming apparatus to further perform an operation to prevent an additional portion of the wagering game content from being presented in 2D when the player viewing perspective is directed away from the wagering game content.

22. A gaming apparatus comprising:

means for electronically tracking a player viewing perspective based on physical movements of a player at a wagering game machine in a casino;

means for graphically rendering wagering game content for a casino wagering game on an autostereoscopic display of the wagering game machine with a stereoscopic three-dimensional effect according to an autostereoscopic view for the autostereoscopic display, wherein the autostereoscopic view is based on the player viewing perspective directed at the wagering game content while a gaze of the player is in a first position relative to the wagering game content;

means for electronically detecting that the gaze of the player moves to a second position relative to the wagering game content;

means for determining, based on the gaze of the player moving to the second position, that the player viewing perspective is directed away from at least a portion of the wagering game content;

means for presenting a first graphical rendering of the at least the portion of the wagering game content according with a two-dimensional effect in response to determining that the player viewing perspective is directed away from the at least the portion of the wagering game content;

means for detecting that the gaze of the player moves back to the first position relative to the wagering game content;

means for determining, based on the gaze of the player returning to the first position, that the player viewing perspective is re-directed at the at least the portion of the wagering game content;

means for determining a degree of player attentiveness to the at least the portion of the wagering game content in response to determination that the player viewing perspective is re-directed at the at least the portion of the wagering game content; and means for presenting a second graphical rendering of the at least the portion of the wagering game content with a degree of the stereoscopic three-dimensional effect according to the degree of the player attentiveness.

23. The gaming apparatus of claim 22, wherein the means for determining the degree of the player attentiveness comprises:

means for detecting an amount of time that the gaze of the player is focused on the at least the portion of the wagering game content after determination that that the player viewing perspective is re-directed at the at least the portion of the wagering game content; and means for determining that the amount of time meets a threshold time limit.

24. The gaming apparatus of claim 22, wherein the means for presenting the second graphical rendering of the at least the portion of the wagering game content comprises:

means for progressively restoring a degree of stereoscopic depth effect to the at least the portion of the wagering game content proportional to the degree of player attentiveness.

25. The gaming apparatus of claim 22 further comprising means for selecting the at least the portion of the wagering game content to based on one or more of an importance of a gaming event that occurs during a wagering game session, a likelihood that the gaze of the player will focus on the at least the portion of the wagering game content, and a player preference for presentation of a type of the at least the portion of the wagering game content.

26. The method of claim 1, wherein the gaming system comprises one or more of a monetary input device configured to add monetary funds to a casino wagering game session balance, a wager placement device configured to wager a portion of wagering game funds from a casino wagering game session balance, or a rewards generation device configured to award rewards associated with a casino wagering game outcome to a casino wagering game session balance.

* * * * *